US011756186B2

(12) United States Patent
Delaney

(10) Patent No.: US 11,756,186 B2
(45) Date of Patent: Sep. 12, 2023

(54) WORKPIECE INSPECTION AND DEFECT DETECTION SYSTEM UTILIZING COLOR CHANNELS

(71) Applicant: Mitutoyo Corporation, Kanagawa-ken (JP)

(72) Inventor: Mark Lawrence Delaney, Shoreline, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 74 days.

(21) Appl. No.: 17/476,378

(22) Filed: Sep. 15, 2021

(65) Prior Publication Data

US 2023/0082268 A1 Mar. 16, 2023

(51) Int. Cl.
*G06T 7/00* (2017.01)
*H04N 23/74* (2023.01)

(52) U.S. Cl.
CPC ............ *G06T 7/001* (2013.01); *H04N 23/74* (2023.01); *G06T 2207/10024* (2013.01); *G06T 2207/10152* (2013.01); *G06T 2207/20081* (2013.01); *G06T 2207/30164* (2013.01)

(58) Field of Classification Search
None
See application file for complete search history.

(56) References Cited

U.S. PATENT DOCUMENTS

| | | |
|---|---|---|
| 5,982,920 A | 11/1999 | Tobin, Jr. et al. |
| 6,718,526 B1 | 4/2004 | Eldredge et al. |
| 6,885,977 B2 | 4/2005 | Gavra et al. |
| 7,030,351 B2 | 4/2006 | Wasserman et al. |
| 7,324,682 B2 | 1/2008 | Wasserman |
| 7,359,544 B2 | 4/2008 | Gao et al. |

(Continued)

FOREIGN PATENT DOCUMENTS

| | | | | |
|---|---|---|---|---|
| CN | 109844918 A | * | 6/2019 | ............... G06K 9/46 |
| TW | I751375 B | * | 1/2022 | ........... G06T 7/0002 |

(Continued)

OTHER PUBLICATIONS

Mitutoyo Corporation & Micro Encoder Inc., "QVPAK® 3D CNC Vision Measuring Machine," User's Guide, Version 7, 2003. (329 pages).

(Continued)

*Primary Examiner* — Mohammed Jebari
(74) *Attorney, Agent, or Firm* — Seed IP Law Group LLP

(57) ABSTRACT

A workpiece inspection and defect detection system includes a light source configuration, a lens configuration, and a camera configuration for imaging workpieces. The system acquires training and run mode workpiece images for acquiring corresponding sets of training and run mode workpiece image data. Each set of image data includes at least first and second color channel workpiece image data corresponding to first and second color channels (e.g., for which ratios between the first and second color channel workpiece image data may be determined as part of synthetic image data to improve the ability of the system to detect defects). The defect detection portion is trained based at least in part on the image data, and is utilized to perform analysis to determine defect images that include workpieces with defects (e.g., for which metrology operations may be performed for measuring dimensions of defects, etc.).

19 Claims, 15 Drawing Sheets

(56) References Cited

U.S. PATENT DOCUMENTS

| | | |
|---|---|---|
| 7,454,053 B2 | 11/2008 | Bryll et al. |
| 7,522,763 B2 | 4/2009 | Tessadro |
| 7,570,795 B2 | 8/2009 | Yu et al. |
| 7,602,962 B2 | 10/2009 | Miyamoto et al. |
| 7,627,162 B2 | 12/2009 | Blanford et al. |
| 7,676,077 B2 | 3/2010 | Kulkarni et al. |
| 8,111,905 B2 | 2/2012 | Campbell |
| 8,111,938 B2 | 2/2012 | Bryll et al. |
| 8,135,204 B1 | 3/2012 | Chen et al. |
| 8,165,837 B1 | 4/2012 | Paramasivam et al. |
| 8,254,661 B2 | 8/2012 | Auerbach |
| 8,255,172 B2 | 8/2012 | Auerbach |
| 8,315,453 B2 | 11/2012 | Shlain et al. |
| 8,437,534 B2 | 5/2013 | Shibuya et al. |
| 8,452,076 B2 | 5/2013 | Nakagaki et al. |
| 8,553,970 B2 | 10/2013 | Auerbach |
| 9,013,574 B2 | 4/2015 | Saylor et al. |
| 9,143,674 B2 | 9/2015 | Gladnick |
| 9,167,215 B2 | 10/2015 | Delaney et al. |
| 9,430,743 B2 | 8/2016 | Plihal |
| 9,430,824 B2 | 8/2016 | Sezginer et al. |
| 9,607,233 B2 | 3/2017 | Kaizerman et al. |
| 9,613,255 B2 | 4/2017 | Amzaleg et al. |
| 9,613,411 B2 | 4/2017 | Konuru et al. |
| 9,639,083 B2 | 5/2017 | Tseo et al. |
| 9,646,425 B2 | 5/2017 | Yu et al. |
| 9,715,723 B2 | 7/2017 | Shlain et al. |
| 9,830,694 B2 | 11/2017 | Bryll |
| 9,961,253 B2 | 5/2018 | Bryll et al. |
| 10,043,264 B2 | 8/2018 | Greenberg et al. |
| 10,101,572 B2 | 10/2018 | Bryll et al. |
| 10,341,646 B2 | 7/2019 | Gladnick et al. |
| 10,436,720 B2 | 10/2019 | He et al. |
| 10,482,590 B2 | 11/2019 | He et al. |
| 10,520,301 B1 | 12/2019 | Tobiason |
| 10,748,271 B2 | 8/2020 | Asbag et al. |
| 10,880,468 B1 | 12/2020 | Bryll |
| 11,150,200 B1 | 10/2021 | Watson et al. |
| 2004/0156540 A1 | 8/2004 | Gao et al. |
| 2006/0245634 A1* | 11/2006 | Soenksen ............ G01N 21/9501 382/149 |
| 2007/0156379 A1 | 7/2007 | Kulkarni et al. |
| 2007/0230770 A1 | 10/2007 | Kulkarni et al. |
| 2007/0288219 A1 | 12/2007 | Zafar et al. |
| 2009/0080759 A1 | 3/2009 | Bhaskar et al. |
| 2010/0158343 A1 | 6/2010 | Bryll |
| 2011/0103679 A1 | 5/2011 | Campbell |
| 2011/0133054 A1 | 6/2011 | Campbell |
| 2012/0154571 A1 | 6/2012 | Bryll |
| 2013/0279795 A1 | 10/2013 | Shlain et al. |
| 2015/0254832 A1 | 9/2015 | Plihal |
| 2016/0189055 A1 | 6/2016 | Zvitia |
| 2016/0299493 A1 | 10/2016 | Yu et al. |
| 2018/0107928 A1* | 4/2018 | Zhang ............... G06F 18/24143 |
| 2018/0130199 A1 | 5/2018 | Brauer et al. |
| 2018/0197714 A1 | 7/2018 | Plihal et al. |
| 2018/0204315 A1 | 7/2018 | Plihal et al. |
| 2019/0067060 A1* | 2/2019 | Plihal ..................... G06T 7/001 |
| 2019/0073566 A1 | 3/2019 | Brauer |
| 2019/0104302 A1 | 4/2019 | Gladnick et al. |
| 2019/0147283 A1 | 5/2019 | Giering et al. |
| 2019/0188543 A1 | 6/2019 | Tamai |
| 2019/0228519 A1* | 7/2019 | Guo ....................... G06T 7/001 |
| 2020/0064278 A1 | 2/2020 | Safai |
| 2020/0234428 A1 | 7/2020 | George et al. |
| 2021/0063897 A1 | 3/2021 | Gladnick et al. |
| 2021/0078062 A1 | 3/2021 | Takahashi et al. |
| 2021/0118091 A1 | 4/2021 | Betz et al. |
| 2021/0191228 A1 | 6/2021 | Gladnick |
| 2021/0192714 A1* | 6/2021 | Bhatt ....................... G06T 7/11 |
| 2021/0264147 A1 | 8/2021 | Kadambi et al. |

FOREIGN PATENT DOCUMENTS

| | | |
|---|---|---|
| WO | WO 2019133234 A1 | 7/2019 |
| WO | WO-2019229119 A1 * | 12/2019 |

OTHER PUBLICATIONS

Quazi, et al., "Laser-based Surface Modifications of Aluminum and its Alloys," *Critical Reviews in Solid State Materials Sciences*, 1-26, Oct. 19, 2015.

Zeiler et al., "Visualizing and Understanding Convolutional Networks," arXiv:1311.2901v3, Nov. 28, 2013. (11 pages).

* cited by examiner

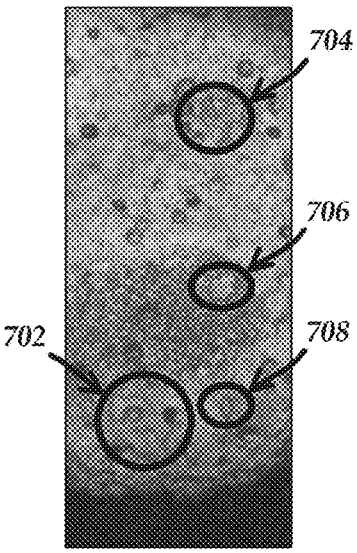 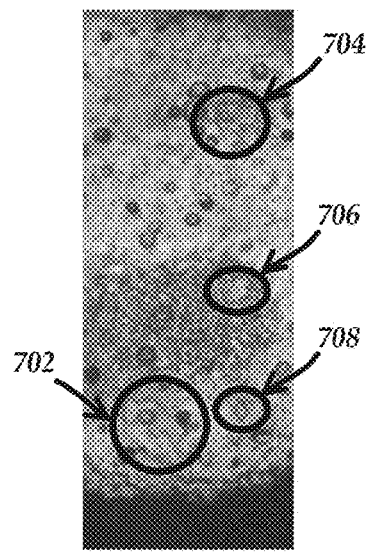 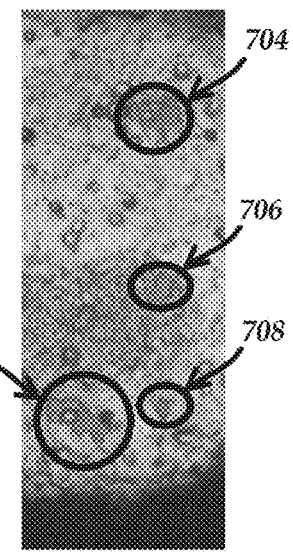
*Fig. 7A.*  *Fig. 7B.*  *Fig. 7C.*
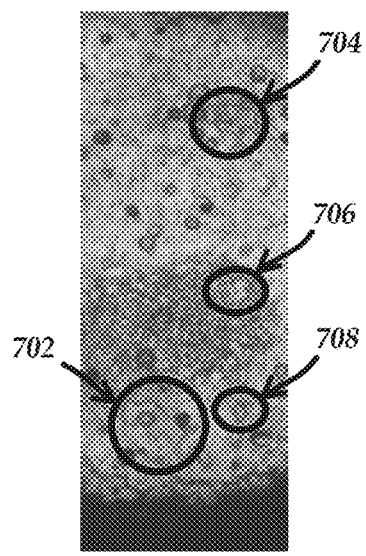 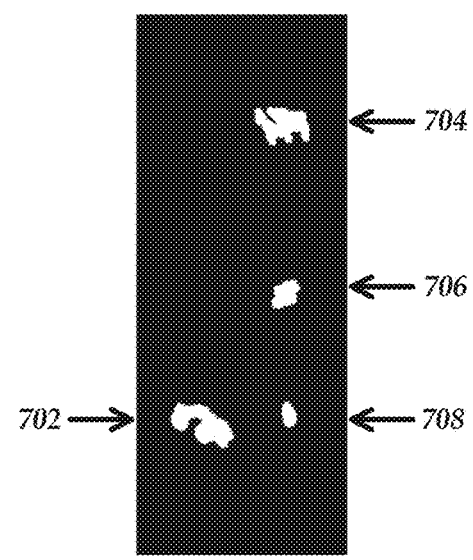
*Fig. 7D.*  *Fig. 7E.*

WORKPIECE INSPECTION AND DEFECT DETECTION SYSTEM UTILIZING COLOR CHANNELS

FIELD

This disclosure relates to workpiece inspection systems, and more particularly to precision metrology systems for inspecting workpieces and detecting defects.

BACKGROUND

Certain precision metrology systems such as machine vision inspection systems (or "vision systems" for short) may be utilized to obtain images of workpieces for inspection. Such systems may be utilized for various types of applications (e.g., general workpiece inspection, metrology applications for determining precise dimensional measurements of workpieces, etc.) Some such systems may generally include a computer, a camera and optical system. In certain configurations, a movement mechanism (e.g., a precision stage, a conveyor, etc.) may be included that moves to allow workpiece traversal and inspection. One exemplary prior art machine vision inspection system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope-type optical system and moves the stage to provide inspection images of workpieces.

Such metrology systems have typically faced various types of challenges for inspecting workpieces (e.g., due to variations in the types of materials and/or surfaces of the workpieces being inspected, changing inspection conditions, etc.) A system that can provide improvements with respect to such issues for certain types of inspection operations (e.g., for workpiece defect detection and/or improved accuracy for detecting defects, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A workpiece inspection and defect detection system is provided including a light source configuration, a lens configuration, a camera configuration that receives imaging light transmitted along the imaging optical path for providing workpiece images, one or more processors, and a memory. The light source configuration is configured to provide a plurality of color channels, with each color channel corresponding to a different color. The lens configuration inputs image light arising from a surface of a workpiece which is illuminated by the light source configuration, and transmits the image light along an imaging optical path. The camera configuration receives imaging light transmitted along the imaging optical path for providing workpiece images.

The memory is coupled to the one or more processors and stores program instructions that when executed by the one or more processors cause the one or more processors to at least: acquire training mode workpiece images for acquiring a plurality of sets of training mode workpiece image data, wherein each set of training mode workpiece image data comprises first color channel training mode workpiece image data corresponding to a first color channel, and second color channel training mode workpiece image data corresponding to a second color channel; train a defect detection portion based at least in part on the plurality of sets of training mode workpiece image data; acquire run mode workpiece images for acquiring a plurality of sets of run mode workpiece image data, wherein each set of run mode workpiece image data comprises first color channel run mode workpiece image data corresponding to the first color channel, and second color channel run mode workpiece image data corresponding to the second color channel; and utilize the trained defect detection portion to perform analysis that is based at least in part on the plurality of sets of run mode workpiece image data to determine defect images that include workpieces with defects.

In various implementations, the training of the defect detection portion based at least in part on the plurality of sets of training mode workpiece image data comprises, for each set of training mode workpiece image data, utilizing the corresponding first and second color channel training mode workpiece image data to generate corresponding training mode synthetic image data that is utilized to train the defect detection portion; and the utilizing of the trained defect detection portion to perform analysis that is based at least in part on the plurality of sets of run mode workpiece image data to determine defect images that include workpieces with defects comprises, for each set of run mode workpiece image data, utilizing the corresponding first and second color channel run mode workpiece image data to generate corresponding run mode synthetic image data that is analyzed by the trained defect detection portion.

In various implementations, for each set of training mode workpiece image data, a plurality of ratios are determined between the corresponding first and second color channel training mode workpiece image data; and for each set of run mode workpiece image data, a plurality of ratios are determined between the corresponding first and second color channel run mode workpiece image data. In various implementations, the image data for each image as described herein comprises a plurality of pixel values, with each pixel value (e.g., comprising a brightness value) corresponding to a pixel of the image. Pixels in a same location or otherwise imaging a same surface point on a workpiece in different images may be designated as corresponding pixels between the images with different corresponding pixel values (e.g., for which the different corresponding pixel values may result from the different color light utilized to illuminate the workpiece for each image). In various implementations, the determining of the plurality of ratios between the corresponding first and second color channel training mode workpiece image data comprises, for each pixel value of the corresponding first color channel training mode workpiece image data, determining a ratio between that pixel value and a corresponding pixel value of the corresponding second color channel training mode workpiece image data; and the determining of the plurality of ratios between the corresponding first and second color channel run mode workpiece image data comprises, for each pixel value of the corresponding first color channel run mode workpiece image data, determining a ratio between that pixel value and a corresponding pixel value of the corresponding second color channel run mode workpiece image data. In various implementations, the training of the defect detection portion based at least in part on the plurality of sets of training mode workpiece image data comprises, for each set of training mode workpiece image data, utilizing the ratios of the pixel values of the corresponding first and second color channel training mode workpiece image data to determine corresponding pixel values for corresponding training mode synthetic image data that is utilized for training the defect detection portion; and the utilizing of the trained defect detection portion to perform analysis that is based at least in part on the plurality of sets of run mode workpiece image data to determine defect images that include workpieces with defects comprises, for each set of run mode workpiece image data, utilizing the ratios of the pixel values of the corresponding first and second color channel run mode workpiece image data to determine corresponding pixel values for corresponding run mode synthetic image data that is analyzed by the trained defect detection portion.

In various implementations, the light source configuration comprises a first light source for providing first color light for the first color channel and a second light source for providing second color light for the second color channel, for which the first and second color light correspond to different wavelengths of light. In various implementations, the first light source is a first light emitting diode and the second light source is a second light emitting diode.

In various implementations, at least some workpieces that are inspected include first and second materials for which a presence of exposed second material in an image corresponds to a defect that is detectable by the trained defect detection portion.

In various implementations, at least some workpieces that are inspected include first and second materials for which the first and second materials have first and second reflectance profiles such that a reflectance of the first material is greater than a reflectance of the second material for a first color light that corresponds to the first color channel, and the reflectance of the second material is greater than or equal to the reflectance of the first material for a second color light that corresponds to the second color channel. The components of the light source configuration may be selected to provide the wavelengths of the first and second color light based at least in part on the reflectance profiles of the first and second materials. In various implementations, the light source configuration is configured to provide the first and second color light, and is also configured to provide a third color light for a third color channel, for which: the first and second color light is selected to be utilized and the third color light is not selected to be utilized for inspecting workpieces with the first and second materials based on the reflectance profiles of the first and second materials. In various implementations, the third color light is selected to be utilized for inspecting workpieces with a third material based on a reflectance profile of the third material which is different than the first and second reflectance profiles.

In various implementations, for each set of training mode workpiece image data, the corresponding first and second color channel training mode workpiece image data are produced by respective first and second camera image planes; and for each set of run mode workpiece image data, the corresponding first and second color channel run mode workpiece image data are produced by respective first and second camera image planes.

In various implementations, the program instructions when executed by the one or more processors further cause the one or more processors to: perform one or more metrology operations using one or more defect images.

In various implementations, a method (e.g., a computer-implemented method operated under control of one or more computing systems configured with executable instructions) may be provided of operating a workpiece inspection and defect detection system, the method comprising: acquiring training mode workpiece images for acquiring a plurality of sets of training mode workpiece image data, wherein each set of training mode workpiece image data comprises first color channel training mode workpiece image data corresponding to a first color channel, and second color channel training mode workpiece image data corresponding to a second color channel; training a defect detection portion based at least in part on the plurality of sets of training mode workpiece image data; acquiring run mode workpiece images for acquiring a plurality of sets of run mode workpiece image data, wherein each set of run mode workpiece image data comprises first color channel run mode workpiece image data corresponding to the first color channel, and second color channel run mode workpiece image data corresponding to the second color channel; and utilizing the trained defect detection portion to perform analysis that is based at least in part on the plurality of sets of run mode workpiece image data to determine defect images that include workpieces with defects.

In various implementations, a workpiece inspection and defect detection system may be provided that is configured to: acquire training mode workpiece images for acquiring a plurality of sets of training mode workpiece image data, wherein each set of training mode workpiece image data comprises first color channel training mode workpiece image data corresponding to a first color channel, and second color channel training mode workpiece image data corresponding to a second color channel; train a defect detection portion based at least in part on the plurality of sets of training mode workpiece image data; acquire run mode workpiece images for acquiring a plurality of sets of run mode workpiece image data, wherein each set of run mode workpiece image data comprises first color channel run mode workpiece image data corresponding to the first color channel, and second color channel run mode workpiece image data corresponding to the second color channel; and utilize the trained defect detection portion to perform analysis that is based at least in part on the plurality of sets of run mode workpiece image data to determine defect images that include workpieces with defects.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7C are examples of images of a portion of a workpiece that includes defects, as may be acquired using a workpiece inspection and defect detection system similar to that of FIG. 1; FIG. 7D is an example of a synthetic image generated based on the images of FIGS. 7A-7C; and FIG. 7E is an example of an image of a defect mask.

DETAILED DESCRIPTION

Figure 1:
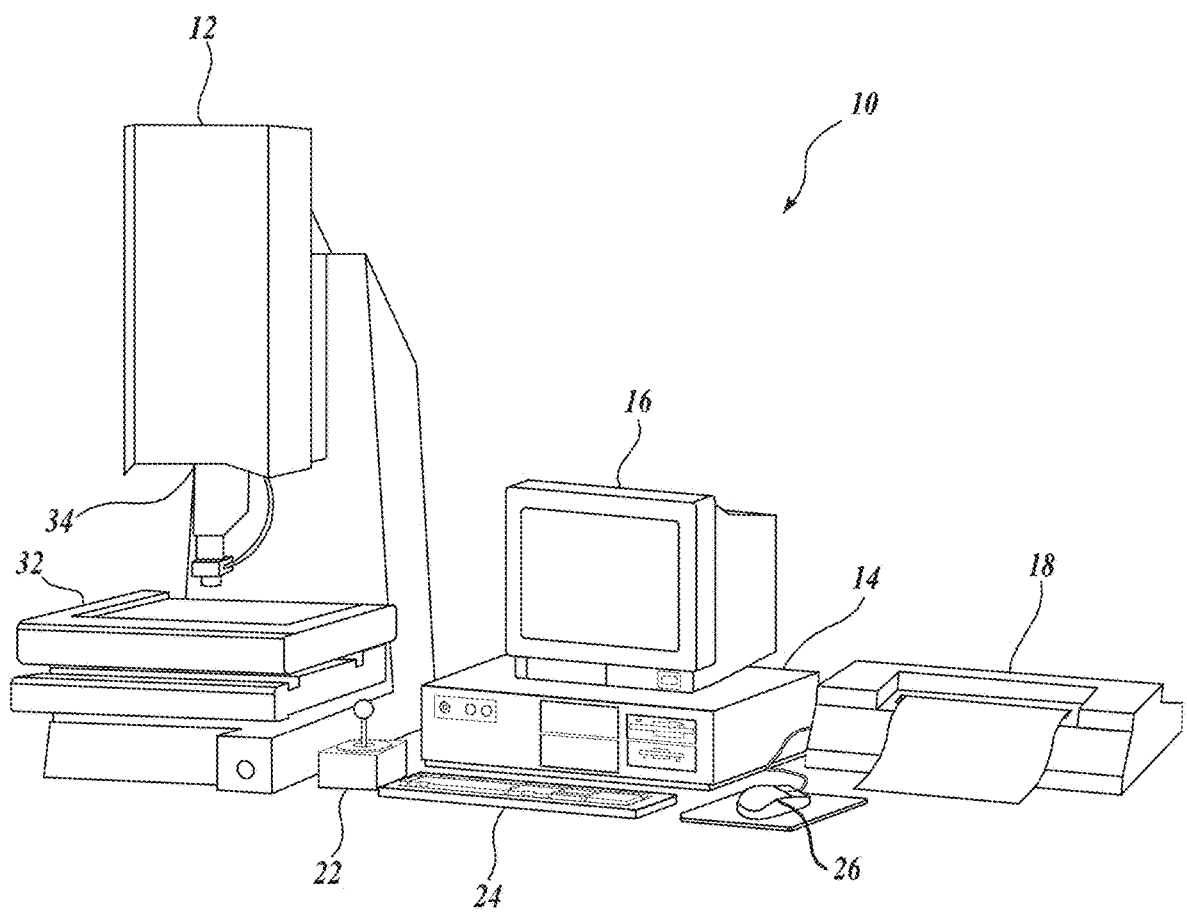
FIG. 1 is a diagram showing various components of one implementation of a workpiece inspection and defect detection system.

FIG. 1 is a block diagram of an exemplary workpiece inspection and defect detection system 10. In the example of FIG. 1, the workpiece inspection and defect detection system 10 may include, be part of, or in some instances alternatively be referenced as, a machine vision inspection system. The workpiece inspection and defect detection system 10 includes a vision inspection machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the workpiece inspection and defect detection system 10. It will be appreciated that in various exemplary implementations, a touchscreen tablet and/or similar devices or the like may be substituted for and/or redundantly provide the functions of any or all of the elements 14, 16, 22, 24 and 26.

Those skilled in the art will appreciate that the controlling computer system 14 and/or other control systems described herein may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision inspection machine 12 includes a moveable workpiece stage 32 and an optical imaging system 34 with a lens configuration that may include a zoom lens or interchangeable objective lenses. The zoom lens or interchangeable objective lenses generally provide various magnifications for the images provided by the optical imaging system 34. Various exemplary implementations of the vision inspection machine 12 are also described in U.S. Pat. Nos. 7,454,053; 7,324,682; 8,111,905; and 8,111,938, each of which is hereby incorporated herein by reference in its entirety.

As some examples of possible system components, the camera configuration of the optical imaging system 34 of the workpiece inspection and defect detection system 10 may include a monochrome camera, with different respective colored Light Emitting Diodes (LEDs) being utilized in the system for different color channels. In other implementations, a Red, Green, Blue (RGB) camera, or a two or three sensor camera may be utilized that is capable of distinguishing/producing images for different wavelengths. In such instances, rather than illuminating the workpiece at different times with the different LEDs, a white light source may be utilized (e.g., with a beam splitter and narrowband color filters) for implementing the different color channels. In some implementations, it may be desirable to produce the images more quickly, for which a multiple image sensor camera etc. may be advantageous (e.g., rather than capturing each color image at a different time). In various implementations, a workpiece inspection and defect detection system may include, utilize and/or receive data from multiple camera configurations and/or other components as described herein (e.g., as part of a single vision inspection machine or multiple vision inspection machines or components thereof and/or computer systems etc., as parts of the workpiece inspection and defect detection system).

Figure 2:
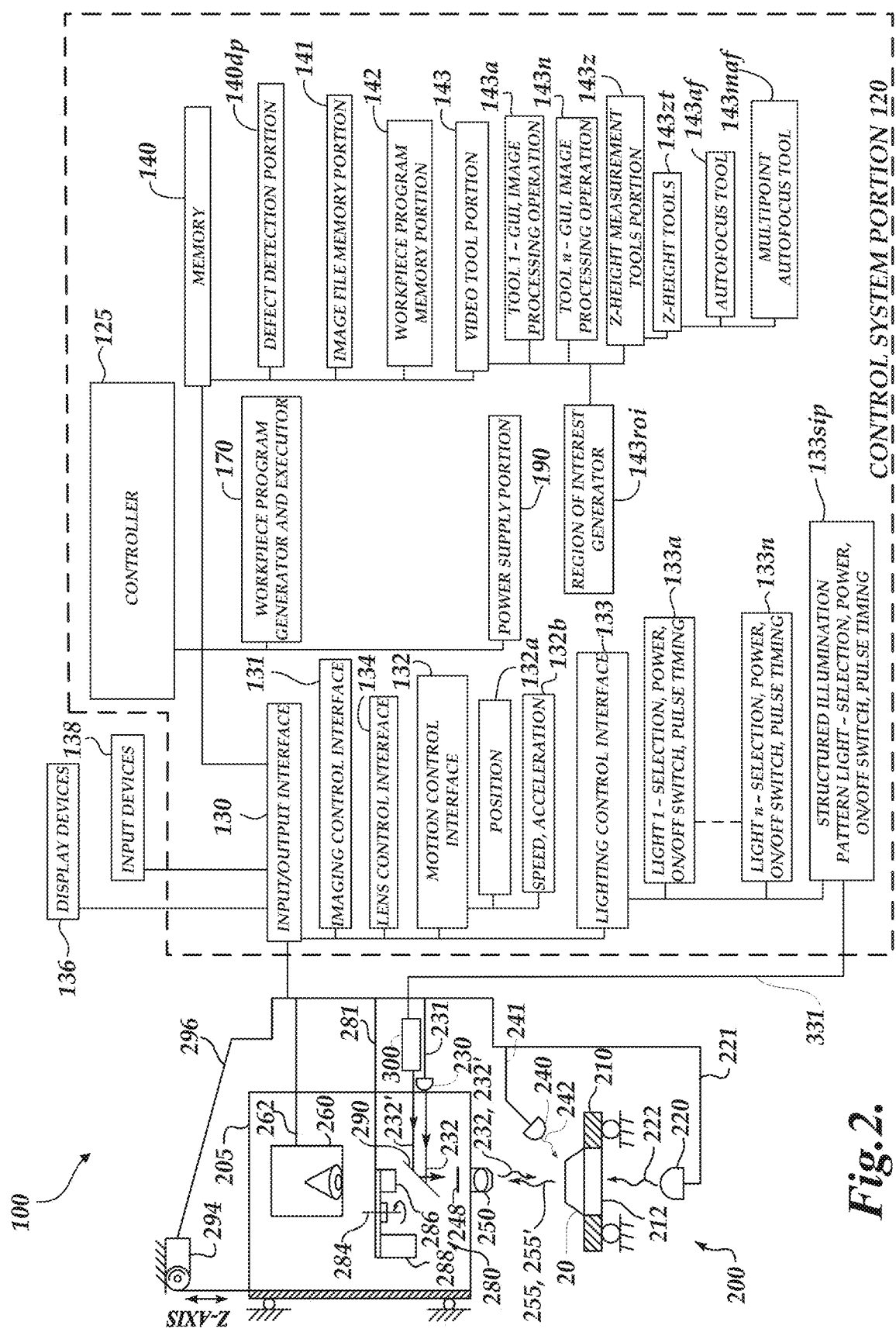
FIG. 2 is a block diagram of a control system portion and a vision components portion of a workpiece inspection and defect detection system similar to that of FIG. 1 and including certain features disclosed herein.
Figure 3A:
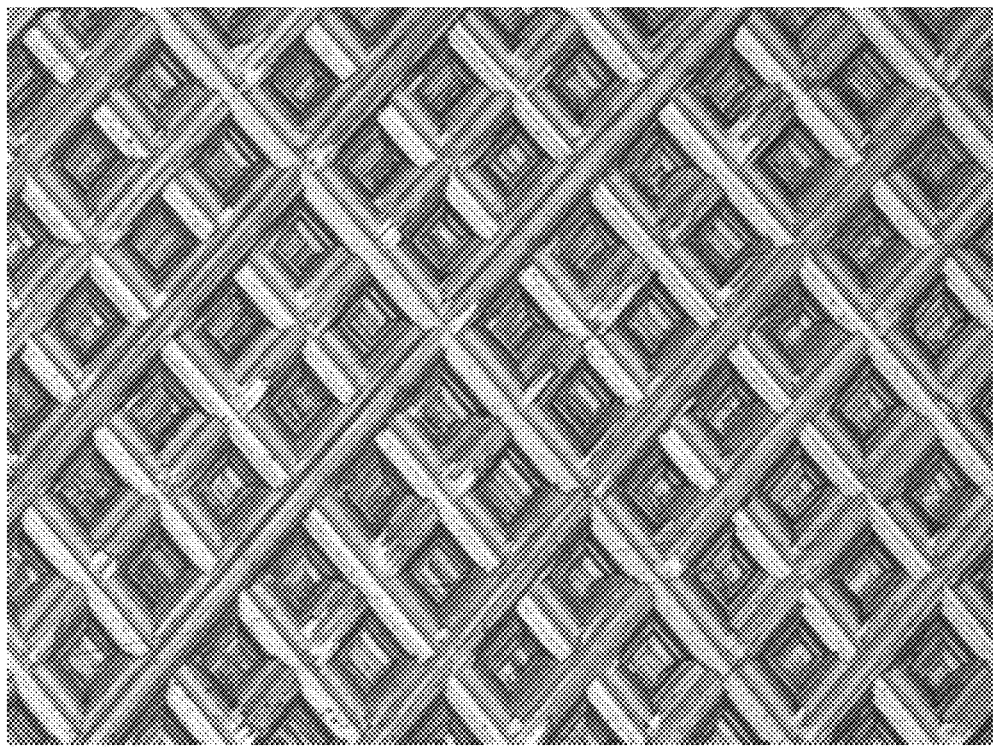
FIGS. 3A-3F are examples of images of portions of workpieces that do not include defects, as may be acquired using a workpiece inspection and defect detection system similar to that of FIG. 1.
Figure 3B:
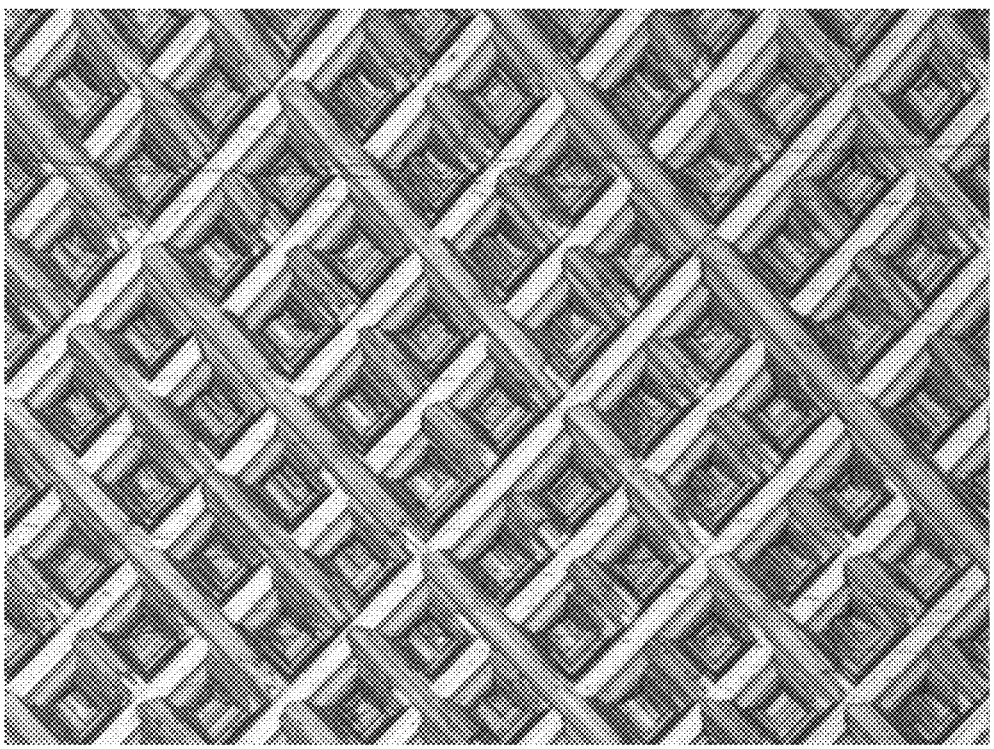
Figure 3C:
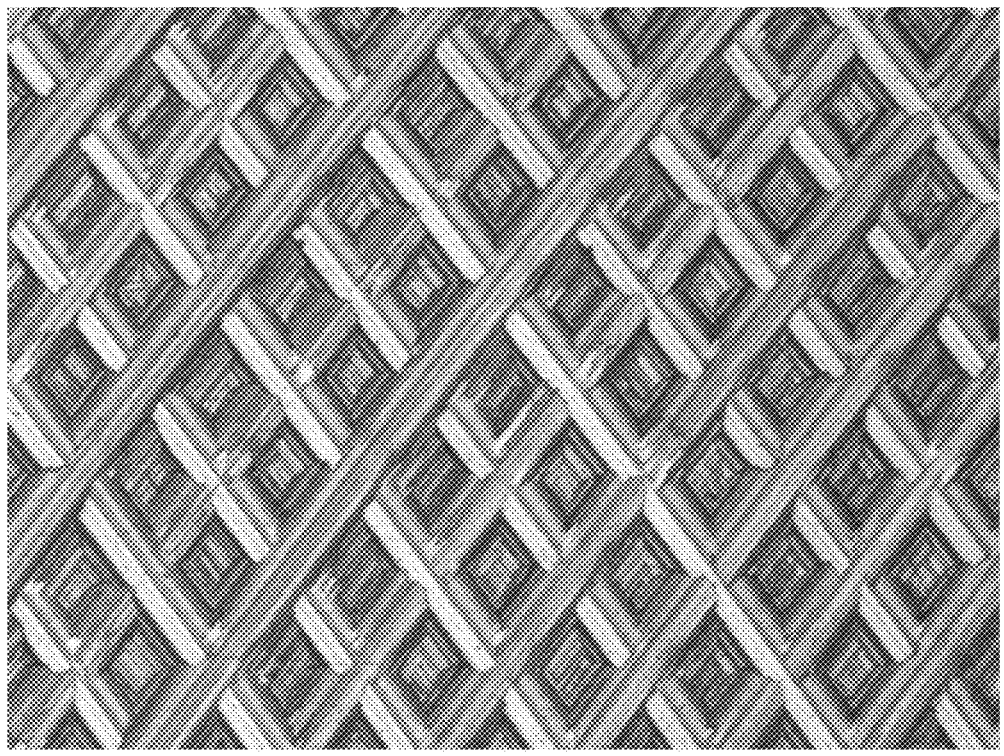
Figure 3D:
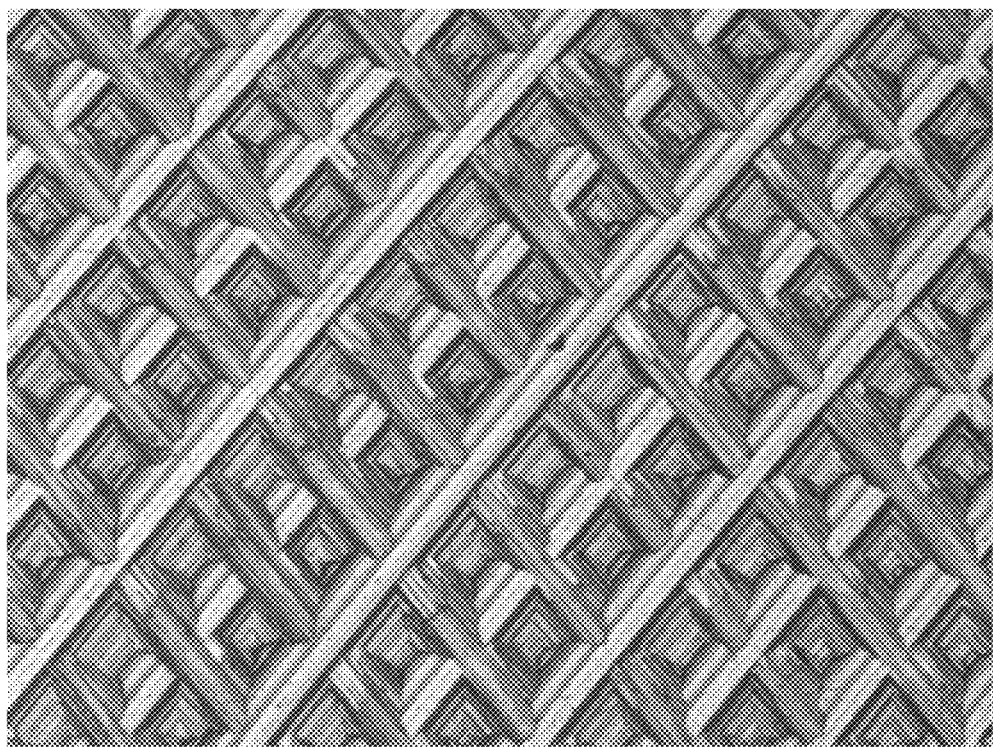
Figure 3E:
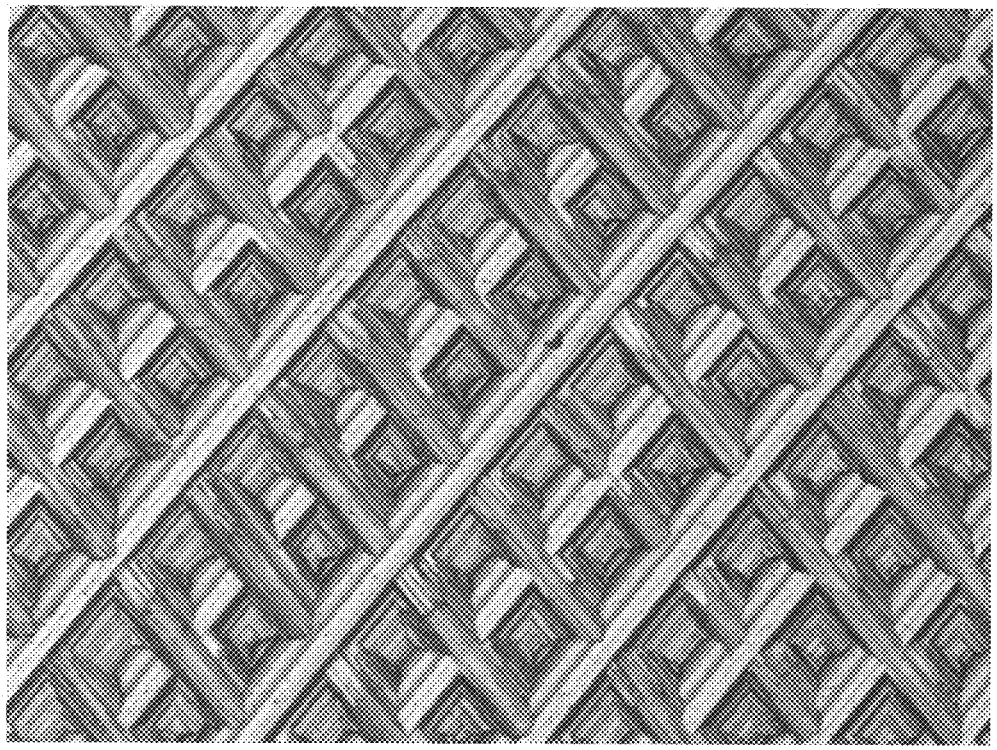
Figure 3F:
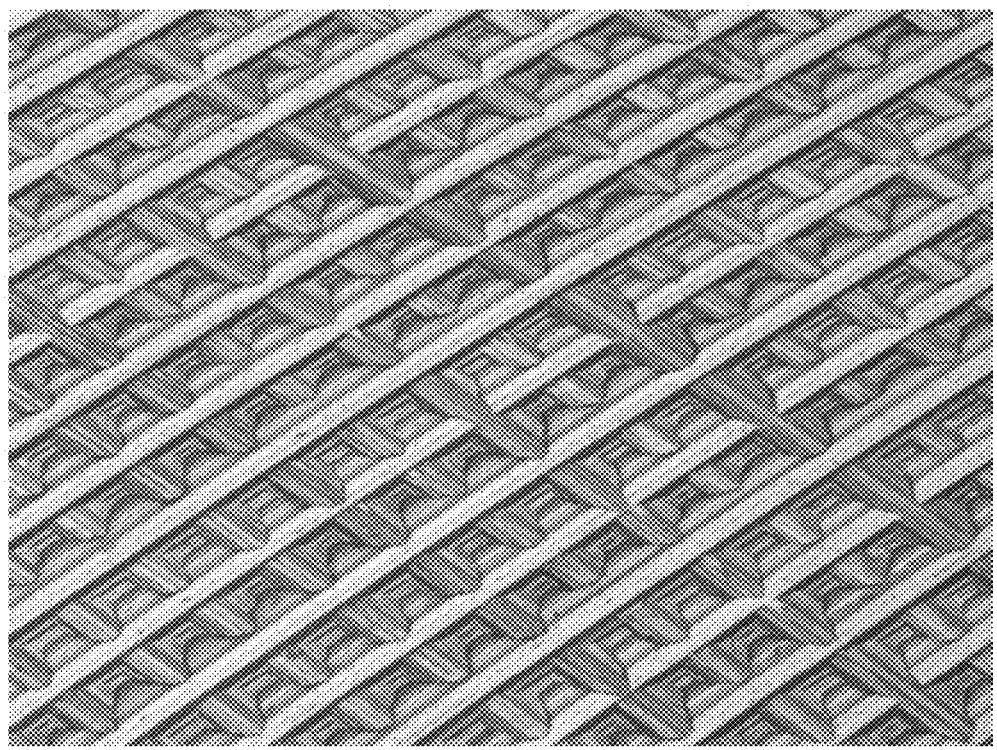

FIG. 2 is a block diagram of a control system portion 120 and a vision components portion 200 of a workpiece inspection and defect detection system 100 similar to the workpiece inspection and defect detection system of FIG. 1, including certain features disclosed herein. As will be described in more detail below, the control system portion 120 is utilized to control the vision components portion 200. The control system portion 120 may be arranged to exchange data and control signals with the vision components portion 200. The vision components portion 200 includes an optical assembly portion 205, light sources 220, 230, 240, 300, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera configuration 260 (e.g., including one or more cameras and/or various camera components) and a lens configuration with an interchangeable objective lens 250. In some implementations, the lens configuration of the optical assembly portion 205 may optionally include a variable focal length (VFL) lens, e.g., a tunable acoustic gradient (TAG) such as that disclosed in U.S. Pat. No. 9,143,674, which is hereby incorporated herein by reference in its entirety.

In various exemplary implementations, the lens configuration of the optical assembly portion 205 may further include a turret lens assembly 280 having lenses 286 and 288. As an alternative to the turret lens assembly, in various exemplary implementations a fixed or manually interchangeable magnification-altering lens, or a zoom lens configuration, or the like, may be included. In various exemplary implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296, to change the focus of the image over a certain range. A workpiece 20 may be placed on the workpiece stage 210. The workpiece stage 210 may be controlled to move relative to the optical assembly portion 205, such that the field of view of the interchangeable objective lens 250 moves between locations on the workpiece 20, and/or among a plurality of workpieces 20.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted as workpiece light 255, and the workpiece light used for imaging passes through the interchangeable objective lens 250 and the turret lens assembly 280 and is gathered by the camera configuration 260 (e.g., including a camera). A workpiece image exposure which includes the image of the workpiece(s) 20, is captured by the camera configuration 260, and is output on a signal line 262 to the control system portion 120.

In various implementations, one or more of the light sources 220, 230, 240 or 300 may include a plurality of light sources (e.g., as part of a light source configuration). For example, in one implementation the light source 230 may include two or three light sources (e.g., such as two or three LEDs, such as red, green and/or blue LEDs), for which the source light 232 may include light from whichever of the light sources is currently turned on. As will be described in more detail below, as part of such a light source configuration, a first light source may correspond to a first color channel (e.g., a blue LED may correspond to a blue color channel) and a second light source may correspond to a second color channel (e.g., a red LED may correspond to a red color channel), etc., for which the different color channels may be utilized for producing different color channel image data, etc.

Various light sources (e.g., the light sources 220, 230, 240, 300) may be connected to a lighting control interface 133 of the control system portion 120 through associated signal lines (e.g., the busses 221, 231, 241, 331, respectively). The control system portion 120 may control the turret lens assembly 280 to rotate along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134.

The lighting control interface 133 may include lighting control elements 133a-133n, that control, for example, the selection, power, and on/off switch for the various corresponding light sources of the workpiece inspection and defect detection system 100. The lighting control interface 133 also includes a lighting control element 133sip that, in the illustrated embodiment, may work in conjunction with a structured illumination pattern (SIP) generating portion 300 to provide structured illumination during image acquisitions. In various implementations, a projected pattern may be output from the SIP generating portion 300 to be input to the beamsplitter 290, where it is directed as coaxial light through the objective lens 250 to provide SIP structured light 232' to illuminate the field of view, and for which the SIP structured light 232' is reflected from the workpiece 20 as workpiece light 255'.

The memory 140 may include an image file memory portion 141, a defect detection portion 140dp, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various exemplary implementations, the autofocus video tool 143af may additionally include a high-speed focus height tool that may be utilized to measure focus heights with high speed using hardware, as described in more detail in U.S. Pat. No. 9,143,674, which is hereby incorporated herein by reference in its entirety. In various exemplary implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570, 795; and 7,030,351, which are each hereby incorporated herein by reference in their entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera configuration 260, and/or to directly control the vision components portion 200.

In various exemplary implementations, when a user utilizes the workpiece inspection and defect detection system 100 to create a part program for the workpiece 20, the user generates part program instructions by operating the workpiece inspection and defect detection system 100 in a training mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The training mode operates such that the sequence(s) are captured or recorded and converted to corresponding part program instructions. These instructions, when the part program is executed, will cause the workpiece inspection and defect detection system to reproduce the trained image acquisition and cause inspection operations to automatically inspect that particular workpiece feature (i.e., that is the corresponding feature in the corresponding location) on a run mode workpiece, or workpieces, which matches the representative workpiece used when creating the part program. In various exemplary implementations, certain types of training modes may also or alternatively be utilized (e.g., a training mode for training a defect detection portion for detecting defects, a training mode for training an anomaly detector portion to detect anomalous images that are not acceptable for defect detection processes, etc.). In various implementations, a training mode may also or alternatively be referenced as a learn mode.

The video tool portion 143 also includes Z-height measurement tools portion 143z, which provides various operations and features related to Z-height measurement operations. In one implementation, the Z-height measurement tools portion 143z may include Z-height tools 143zt. The Z-height tools 143zt may include an autofocus tool 143af, and a multipoint autofocus tool 143maf, for example. The Z-height tools 143zt may govern certain aspects of image stack acquisition and related illumination operations in conjunction with the Z-height tools that are configured in a mode that determines best focus heights and/or Z-height measurements. In general, the Z-height measurement tools portion 143z may perform at least some operations similarly to known Z-height measurement tools, for example, performing operations in a training mode and/or run mode or other mode, for generating all or part of a focus curve, and finding its peak as a best focus position. For example, certain known operations for Z-height measurement tools are described in U.S. Pat. No. 10,520,301, which is hereby incorporated herein by reference in its entirety.

The defect detection portion 140dp performs various defect detection operations, as will be described in more detail below. In various implementations, the defect detection portion 140dp utilizes models that require training data (e.g., training images). For example, the defect detection portion 140dp may be trained using a set of training images captured using specified imaging, lighting and workpiece conditions. In various exemplary implementations, the models may be supervised (e.g., artificial intelligence (AI), etc.) models. The defect detection portion 140dp processes image data corresponding to labeled images of defects (e.g., as labeled by a user and/or automated process) to train a classification model, which in various implementations may be an AI classification model.

In various exemplary implementations, the defect detection portion 140dp may implement a defect detection process that is performed along with a metrology process. In various implementations, it may be desirable to include the defect detection portion 140dp in a workpiece inspection and defect detection system similar to the workpiece inspection and defect detection system 100 of FIG. 1, which is configured to perform a metrology process, because the system can generate image data that are input to the defect detection process implemented by the defect detection portion 140dp. Accordingly, a single machine is configured to perform both a metrology process and a defect detection process, which can provide advantages over conventional metrology systems. For example, if a defect is detected in a workpiece while the defect detection process is performed, there may be no reason to perform the metrology process on the workpiece, which can save time. More specifically, if a defect is detected in a workpiece while the defect detection process is performed, it may not be necessary to measure a clearly defective part. Thus, it may be advantageous to perform the defect detection process prior to starting the metrology process.

Also, some defects might warrant further metrology or inspection to determine additional defect parameters. For example, a 2D image could enable a likely defect to be quickly recognized and enable an XY position of the defect and an approximate XY area of the defect to be quickly ascertained. If the 3D nature of a potential defect is important, the defect detection portion 140dp may cause additional processing (e.g., metrology operations) to be performed to determine whether the potential defect is an actual defect. For example, if a scratch in a surface of a workpiece must be deeper than a particular threshold value to be considered a defect, the defect detection portion 140dp could cause a more time consuming 3D point cloud of the affected region to be acquired (e.g., utilizing a z-height measurement tools portion 143z), to learn if the depth of the scratch is sufficient to cause the part to be rejected. In various implementations, different actions may be performed (e.g., as may be programmed to automatically occur) as a result of an initial defect classification, such as (1) continue with a standard metrology process, (2) stop or pause the defect detection process and perform a metrology process that includes more informative measures of the potential defect (e.g., 3D, different lighting, touch probe measurements such as surface roughness, etc.), (3) send the workpiece to scrap (e.g., discard or recycle workpiece), (4) send the workpiece for additional human inspection, (5) provide feedback to a production line that indicates something may be wrong with the machinery or process, etc.

In various exemplary implementations, the defect detection portion 140dp of the memory 140 stores model data and program instructions for various tools and algorithms of a defect detection system that can be used to infer whether various types of defects are present in an image of a workpiece (i.e., as indicating a defect on a portion of the workpiece surface that is included in the image). While the workpiece inspection and defect detection system is operated in a training or learning mode, the defect detection system uses image data from a set of training images including defect and non-defect images for training the defect detection portion 140dp. The set of training images is captured using specified imaging, lighting, and workpiece conditions. After the defect detection portion 140dp is initially trained, the defect detection portion 140dp is operated in a run mode (e.g., utilizing the same specified imaging, lighting, and workpiece conditions) to infer whether a defect is included in new, previously unseen workpiece image, and to correspondingly classify each workpiece image as a defect or non-defect image.

As will be described in more detail below, FIGS. 3A-3F, 4A-4E, 5A-5D, 7A-7E, and 8A-8F show examples of some workpiece images that may be acquired by the workpiece inspection and defect detection system 100 and for which the image data may in some implementations be utilized to train the defect detection portion 140dp (e.g., as training images and/or testing images) during a training mode (and/or some of the images may be examples of workpiece images that are later acquired by the workpiece inspection and defect detection system 100 during a run mode and may be analyzed by the trained defect detection portion 140dp).

In particular, the example workpiece images of FIGS. 3A-3F and 4A-4E are of different sections (i.e., at different XY locations) on machined aluminum plates, and for which FIGS. 3A-3F show examples of non-defect images and FIGS. 4A-4E show examples of defect images (e.g., for which a set of training images will typically include a number of both defect and non-defect workpiece images), as will be described in more detail below. The differences between the images help illustrate in part why it may be desirable to utilize a number of training images for training the defect detection portion 140dp. More specifically, due in part to different possible characteristics of different workpiece images that may be acquired for inspecting a type of workpiece (e.g., as illustrated by the differences between the workpiece images FIGS. 3A-3F and 4A-4E for inspecting a type of machined aluminum plate), the accuracy of the defect detection portion 140dp for detecting defects may be improved by utilizing a variety of workpiece images for the training that may be similar to a variety of images that may later be acquired during a run mode and/or that may otherwise better enable detection of defects in such images. For example, in specific regard to the examples of FIGS. 3A-3F, 4A-4E and 5A-5D, such training may help the defect detection portion 140dp distinguish between the defects (e.g., which in the illustrated examples may include a variety of different types of scratch defects, etc.) and the features of normal workpiece surfaces (e.g., which in the illustrated examples may include a variety of different types of machining marks formed on the plate surfaces which appear as a hashed texture that normally varies across the surface, etc.)

As noted above, FIGS. 3A-3F and 4A-4E are examples of workpiece images of sections of workpieces which are relatively "flat" machined aluminum plates. Each image is taken from a same angular view point (e.g., directly overhead at a 90 degree angle to the plate) but each at a different XY location on a plate. Each image shows a view that is about 2.5 millimeters by 1.9 millimeters (XY) of a surface of the plates. Accordingly, each image shows a magnified view of a portion of a surface of a plate. Machining marks formed on a plate surface create a hashed texture that normally varies across the surface. In the images, at such a magnified scale, the relatively flat plate may not appear to be flat. In the current example, the height of some of the hashed machining mark ridges may be approximately 5 micrometers or less.

Figure 4A:
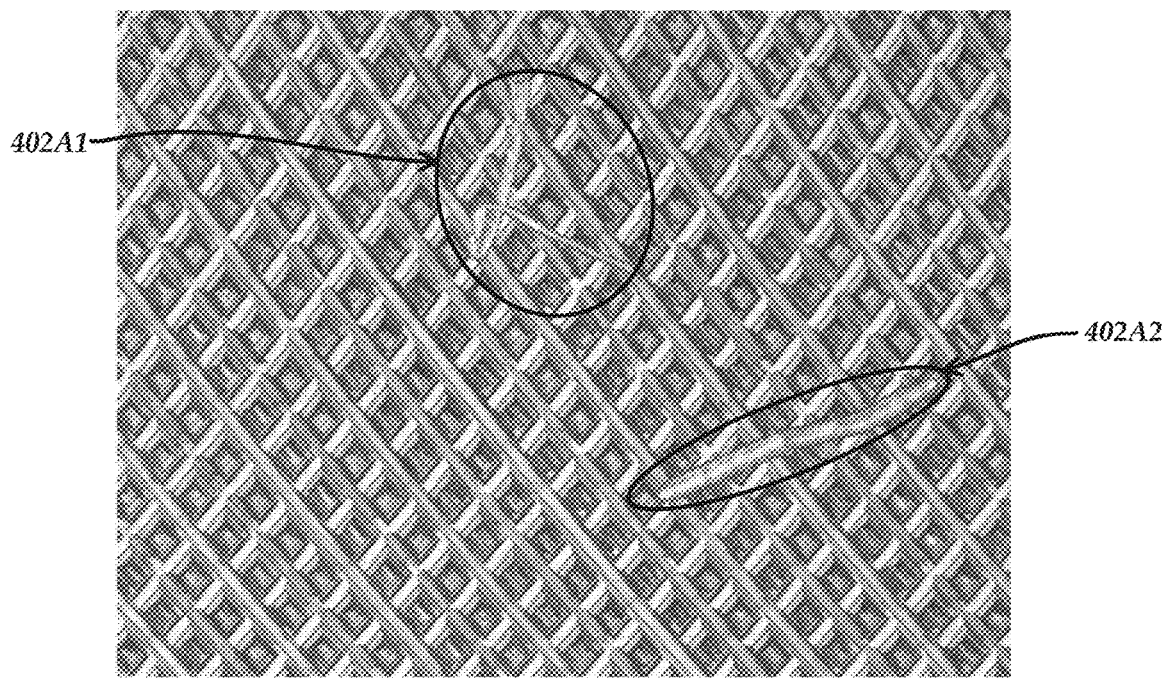
FIGS. 4A-4E are examples of images of portions of workpieces that include defects, as may be acquired using a workpiece inspection and defect detection system similar to that of FIG. 1.
Figure 4B:
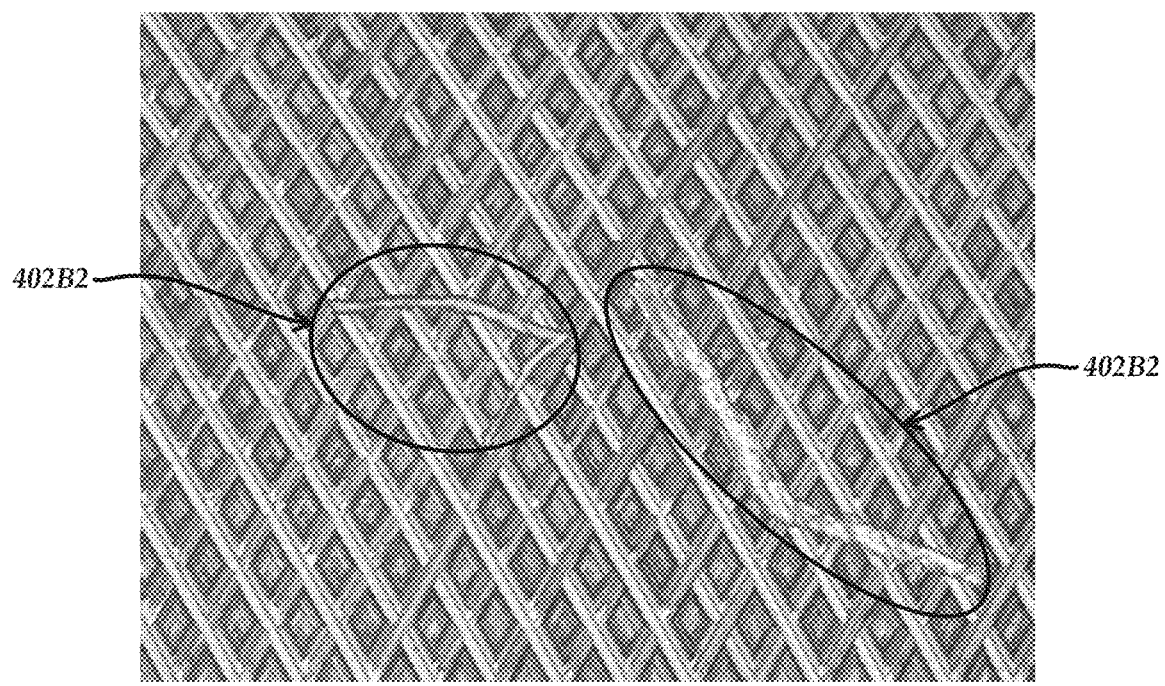
Figure 4C:
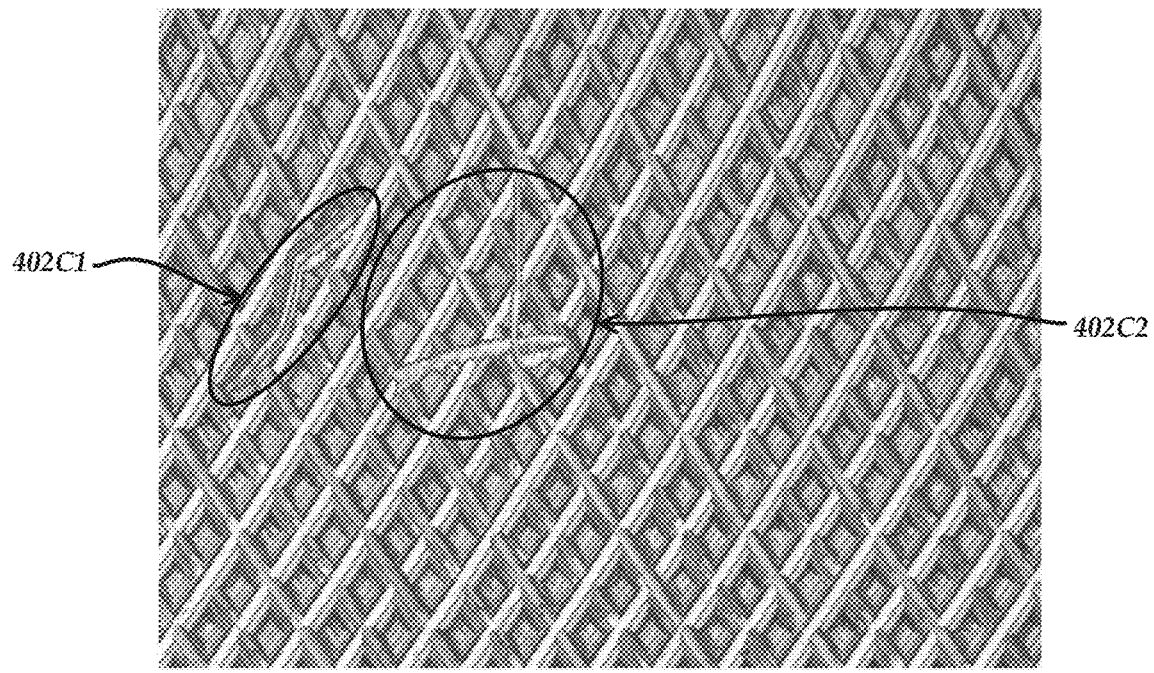
Figure 4D:
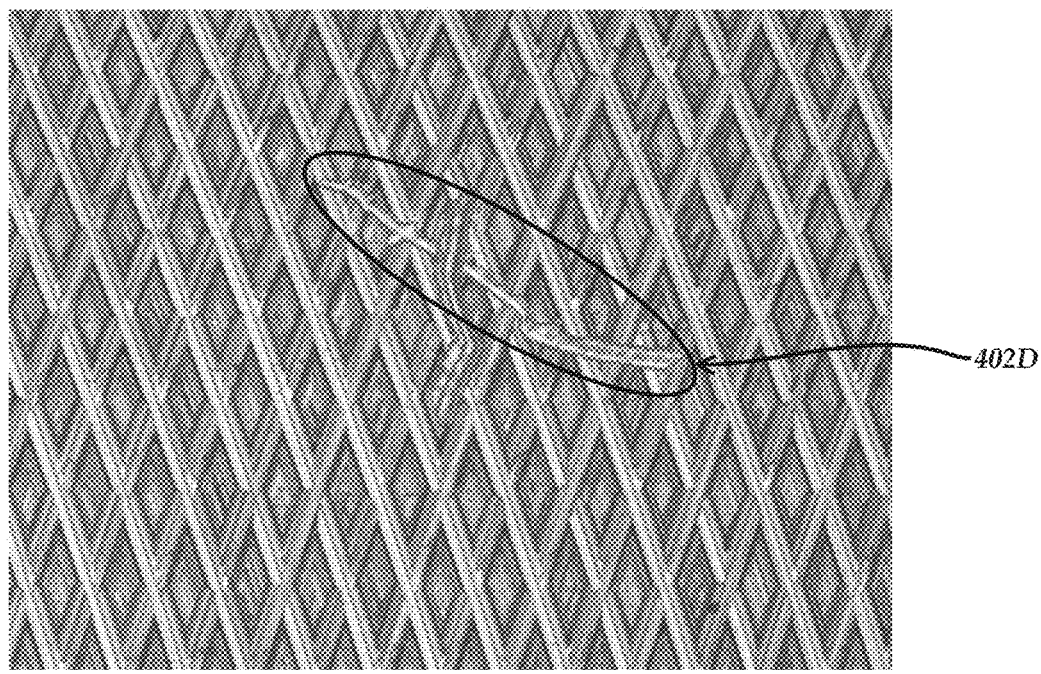
Figure 4E:
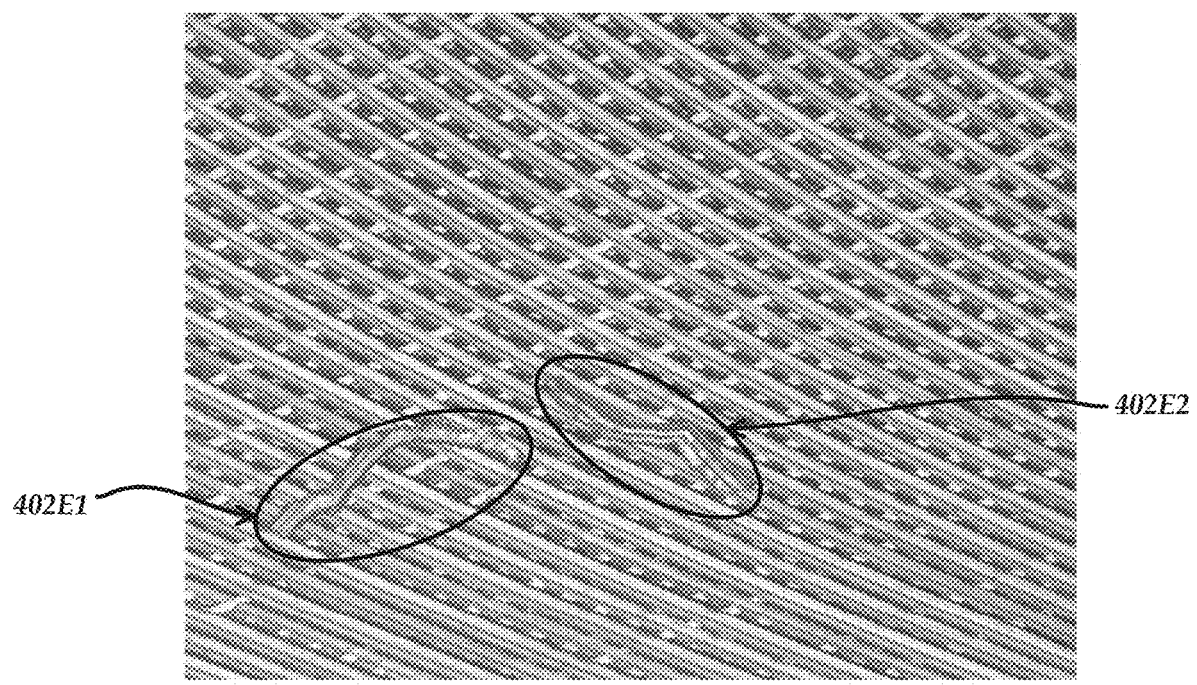

The sections of the machined aluminum plates shown in FIGS. 3A-3F do not include defects. In other words, FIGS. 3A-3F show examples of images of sections of the machined aluminum plate that are "non-defect". In contrast, FIGS. 4A-4E show examples of images of sections of workpieces that include defects. The images shown in FIGS. 4A-4E are similar to those shown in FIGS. 3A-3F, except that the images of FIGS. 4A-4E include defects that are formed on surfaces of machined aluminum plates. The defects in these examples are scratches formed in the surfaces of the machined aluminum plates. More specifically, FIG. 4A illustrates scratch defects 402A1 and 402A2, FIG. 4B illustrates scratch defects 402B1 and 402B2, FIG. 4C illustrates scratch defects 402C1 and 402C2, FIG. 4D illustrates a scratch defect 402D, and FIG. 4E illustrates scratch defects 402E1 and 402E2. As noted above, the variety of characteristics of the defects and workpiece surfaces illustrated in FIGS. 3A-3F and 4A-4E helps illustrate in part why it may be desirable to utilize a number of training images for training the defect detection portion 140dp (e.g., for which the set of training images will typically include a number of defect and non-defect workpiece images).

Figure 5A:
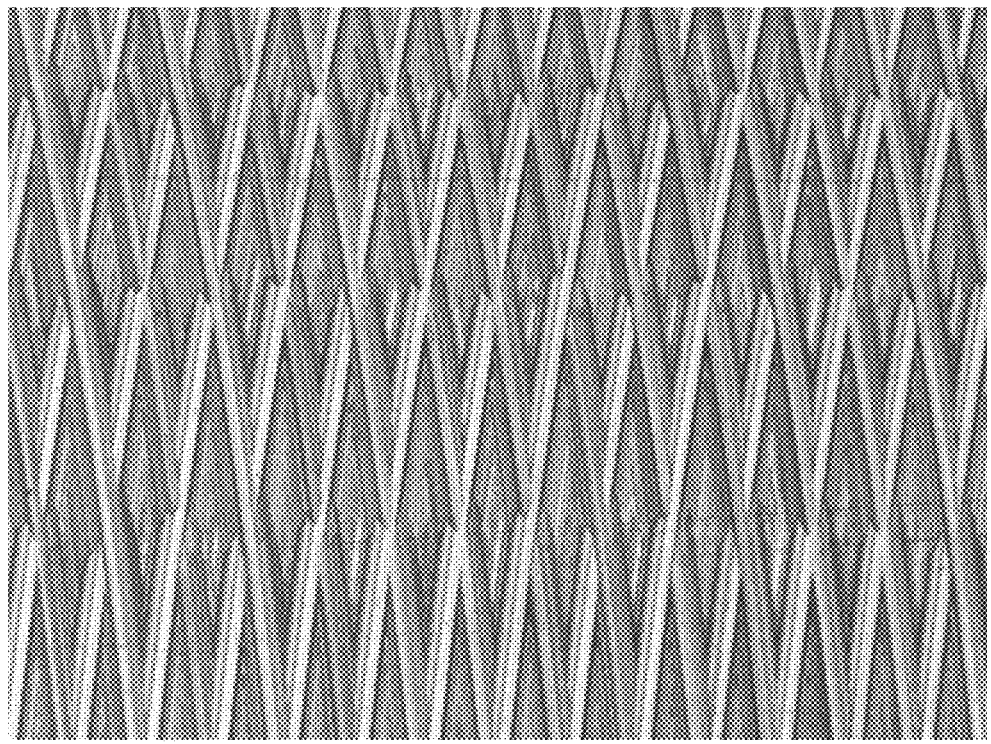
FIGS. 5A-5D are examples of images of similar portions of workpieces, with and without defects, as may be acquired using a workpiece inspection and defect detection system similar to that of FIG. 1.
Figure 5B:
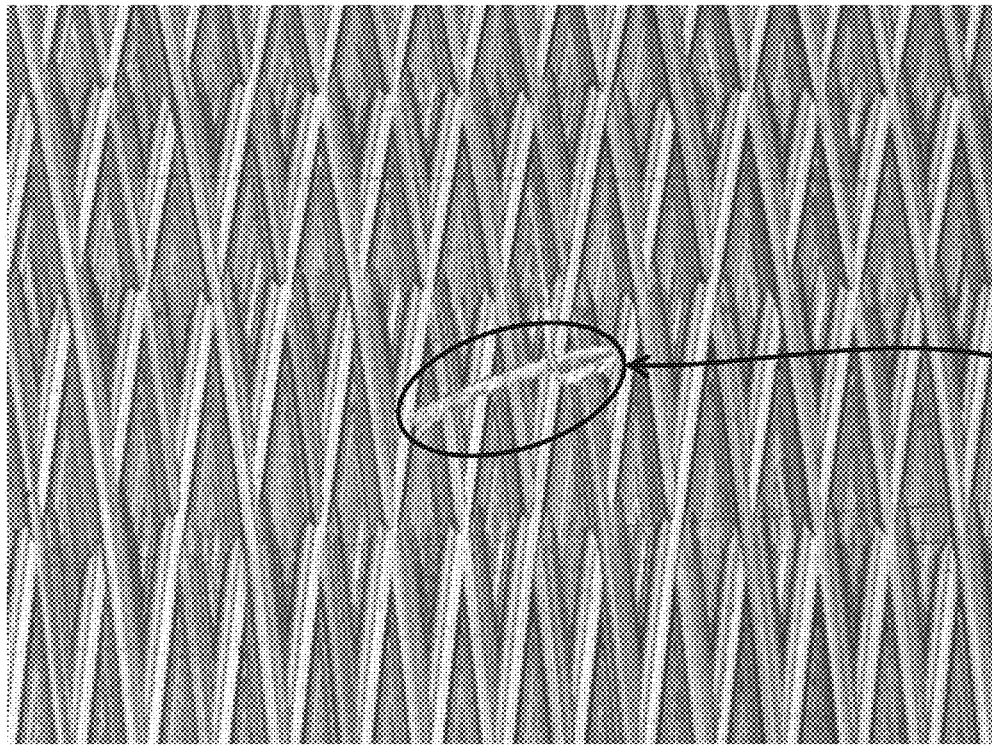
Figure 5C:
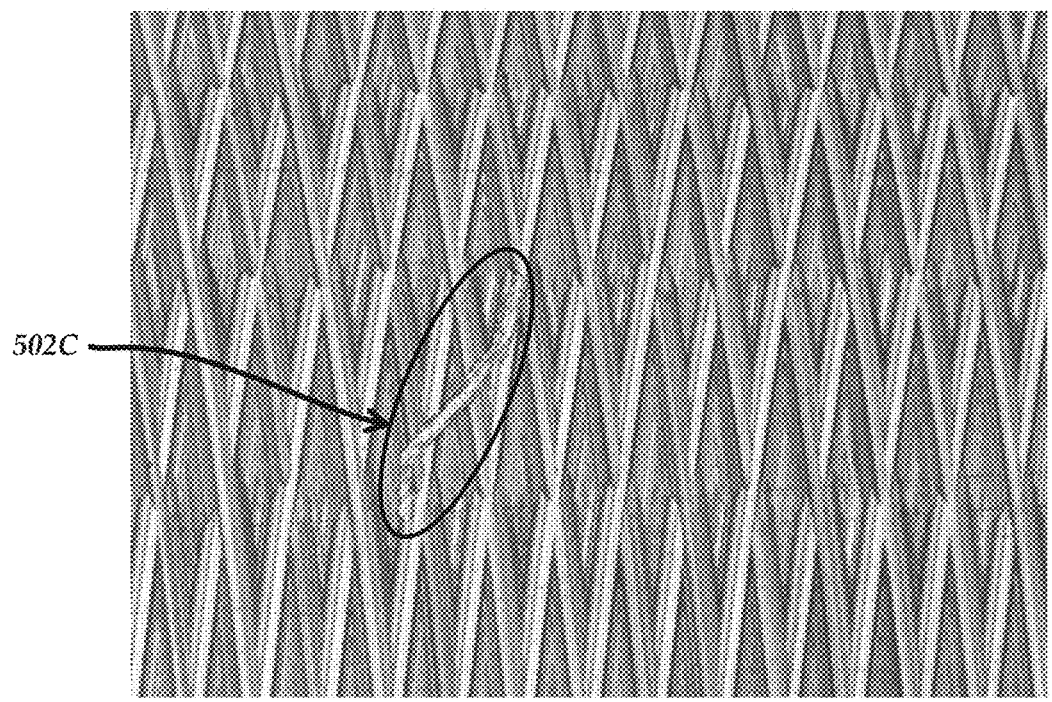
Figure 5D:
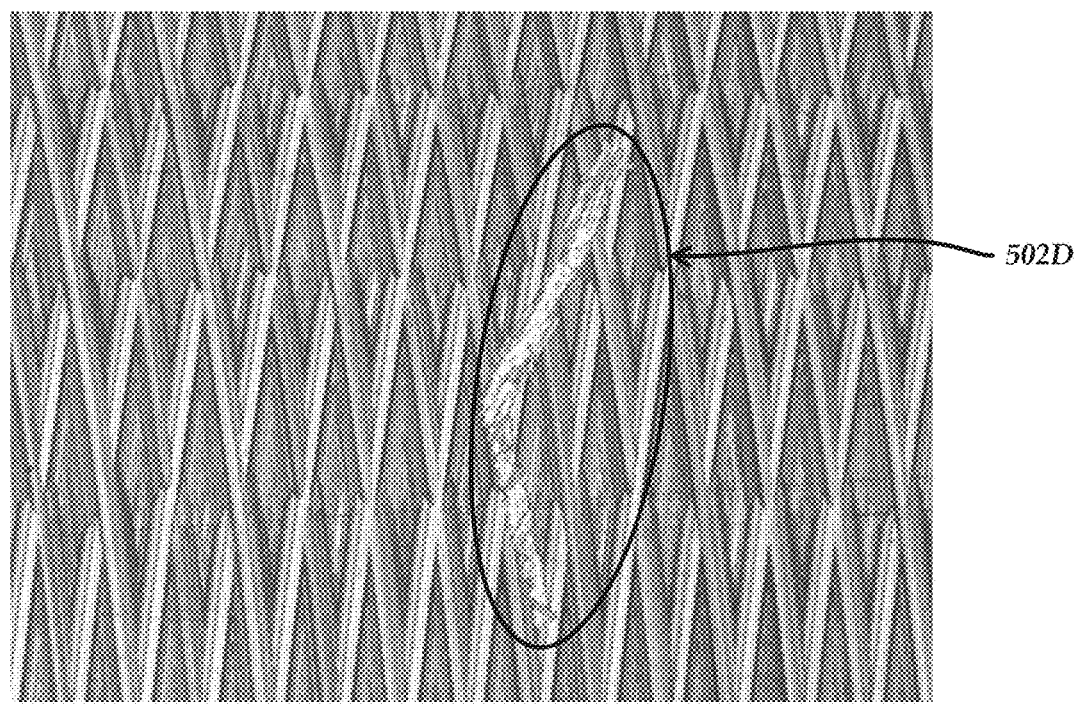

FIGS. 5A-5D are examples of images of similar portions of workpieces, with and without defects, as may be acquired using a workpiece inspection and defect detection system similar to that of FIG. 1. FIG. 5A shows an example section of a plate that may be classified as "non-defect". FIGS. 5B-5D show examples of images of similar sections of similar plates that may be classified as "defect", wherein each of the images includes a scratch defect (e.g., including the respective scratch defects 502B, 502C and 502D). In the examples of FIGS. 5A-5D, the images are of similar portions of workpieces (e.g., for which the types of machining marks formed on the surfaces of the portions are similar or nominally the same in each image and the primary difference between the images is the characteristics of the respective scratch defects 502B, 502C and 502D). In one example implementation, the images of FIGS. 5A-5C may be included as part of a training set of images for training the defect detection portion 140dp.

The image of FIG. 5D may be an example of a run mode image which may be analyzed by the defect detection portion 140dp to determine if it should be classified as a defect image or a non-defect image. In various implementations, the defect detection portion 140dp may have been well trained for being able to properly classify the image of FIG. 5D as a defect image (e.g., as having been trained by the training images of FIGS. 5A-5C including the similar portions of workpieces and scratch defects 502B and 502C having certain similar characteristics as the scratch defect 502D). In various implementations, certain additional processes may be performed with respect to the example scratch defect 502D. For example, one or more metrology processes may be performed in conjunction with the defect detection process, for which various dimensions or other characteristics of the example scratch defect 502D may be determined, as will be described in more detail below with respect to FIG. 6.

Figure 6:
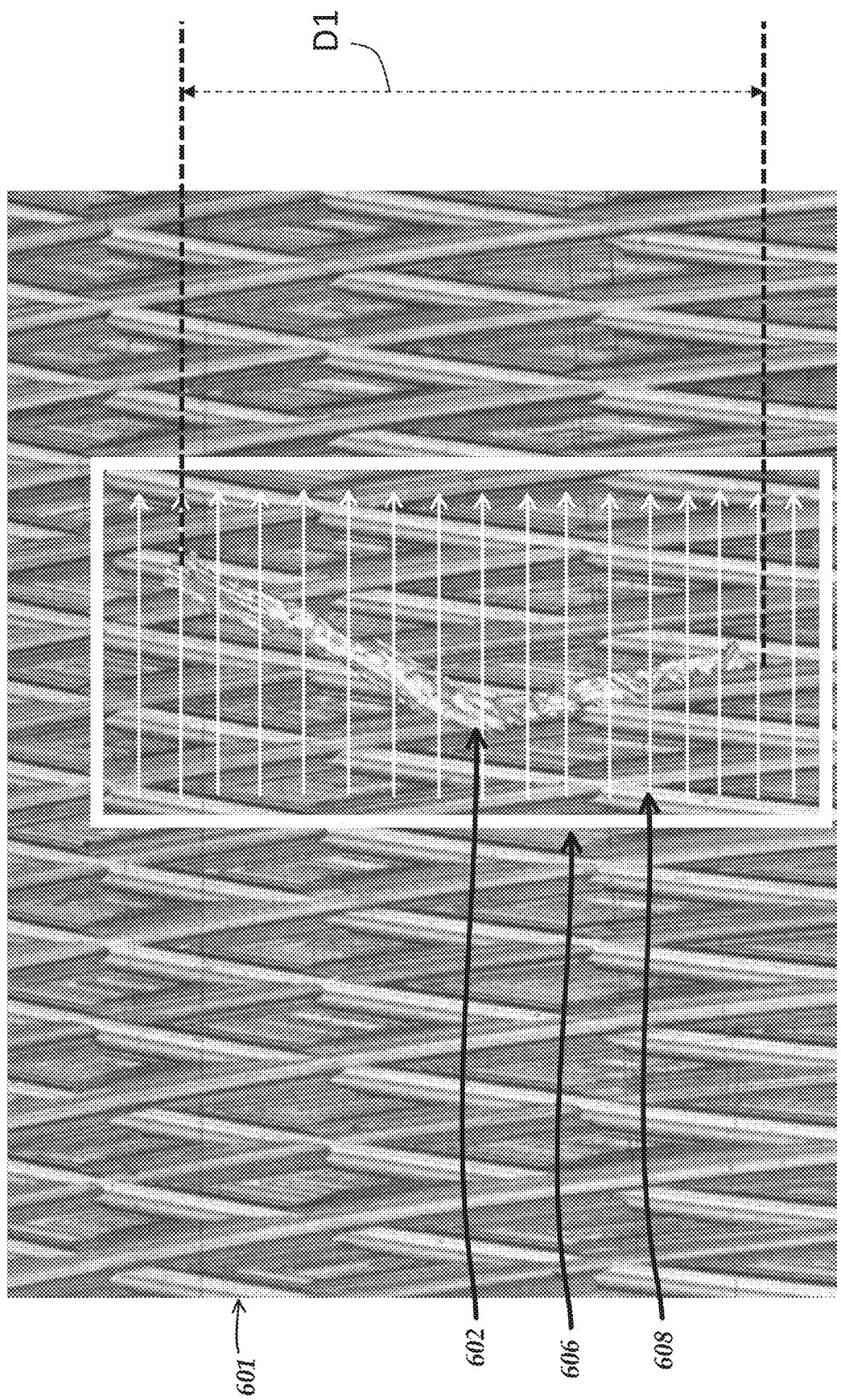
FIG. 6 is a diagram illustrating utilization of one or more video tools for performing metrology operations on an image of a workpiece that includes a defect.

FIG. 6 is a diagram illustrating utilization of one or more video tools for performing metrology operations on an image of a workpiece that includes a defect (e.g., for determining dimensions of the defect, etc.) As illustrated, for an image 601 (e.g., which may be similar or the same as the image of FIG. 5D) that includes a scratch defect 602 (e.g., which may be similar or the same as the scratch defect 502D), a video box tool 606 includes scan lines 608 (e.g., which may also or alternatively be representative of video point tools, etc.) which are utilized for determining the edge locations, dimensions, and/or other aspects of the scratch defect 602. In various exemplary implementations, the video box tool 606 may be sized, positioned and rotated, until the box tool 606 is indicative of, or defines, the region of interest (e.g., the area within the box tool 606), and the arrows shown in FIG. 6 (e.g., representative of scan lines, point tools, etc.) may be utilized to determine the edge(s) of the scratch defect 602. In various exemplary embodiments, the video box tool 606 may generally use one or more conventional edge gradient(s) along the edge(s) of the defect 602 in the region of interest, and the edge(s) of the defect 602 may be determined based on the local magnitudes of the edge gradient(s) along the various scan lines 608, etc.

In various exemplary implementations, such metrology operations may also include performing certain morphological filtering or other filtering (e.g., to distinguish the edges of the scratch from the machined pattern of the workpiece, for which certain types of such filtering are described in U.S. Pat. No. 7,522,763, which is hereby incorporated herein by reference in its entirety). As shown in FIG. 6, in the display area included in the image, the box tool 606 with the scan lines 608 is utilized to determine the edge locations (e.g., the outer edges or perimeter) of the scratch defect 602. Based on such determinations, the video tool and/or other metrology operations may include determining a dimension D1 of the scratch defect (e.g., corresponding to a length or other dimension of the scratch defect 602). In various exemplary implementations, the box tool 606, scan lines 608 and/or other video tools and/or metrology operations may be utilized to determine other dimensions of the scratch defect 602 (e.g., width, depth, etc.) For example, as described above, the video tool portion 143 may include a Z-height measurement tools portion 143z, for which a corresponding video tool or operations may be utilized for determining the Z-height dimensions of the scratch defect (e.g., including determining the depth of the scratch relative to other portions or features of the workpiece surface, etc.).

As part of the general operations of the defect detection portion, some defects that are detected may warrant further metrology or inspection to determine additional defect parameters. For example, as noted above, various types of analysis and/or processing of the defect image that includes the scratch defect 602 may enable determination of the XY position and approximate XY area and/or other dimensions of the defect 602 (e.g., utilizing video tools and/or other operations as described above). If the 3D nature of the potential defect is important (e.g., if a scratch must be deeper than some value to be considered a defect), then the defect detection portion 140dp may initiate a process for utilizing a Z-height measurement tool (e.g., of the Z-height measurement tools portion 143z) or other 3D sensing process (e.g., for acquiring a 3D point cloud of the affected region to determine the depth of the scratch, etc.).

In various implementations, the image data for each image as described herein comprises a plurality of pixel values (e.g., with each pixel value corresponding to a pixel of the image). Descriptions herein of utilizing images (e.g., training mode images) for training the defect detection portion 140dp indicate that the corresponding image data (e.g., training mode image data corresponding to the training mode images) is provided and utilized for training (e.g., and conversely, descriptions herein of utilizing image data for training indicate that the corresponding images are used for training). Similarly, descriptions herein of the defect detection portion 140dp performing analysis on images (e.g., on run mode images to determine defect images including workpieces with defects) indicate that the corresponding image data (e.g., run mode image data corresponding to the run mode images) is provided and utilized for performing the analysis (e.g., and conversely, descriptions herein of utilizing image data for analysis during a run mode indicate that the corresponding images are used for the analysis). As will be described in more detail below, in some implementations for the training or analysis, the image data (e.g., the raw image data obtained from the camera portion) may be utilized to determine synthetic image data (e.g., corresponding to synthetic images) which may be utilized for the training or analysis.

In various implementations, the defect detection portion 140dp is configured to detect defects in a workpiece that includes multiple layers formed from different materials, wherein each defect may correspond to the imaging of a first material where only a second material is expected to be imaged. For example, a workpiece including an aluminum substrate with a layer of copper formed over the top of the aluminum substrate may be subjected to various types of processing (e.g., drilling, etching, etc.) that may accidentally remove too much of the copper and/or other issues may occur (e.g., scratches such as illustrated in FIGS. 3A-3F, 4A-4E, and 5B-5D, etc.), such that the aluminum substrate is exposed, which would correspond to a defect. In other words, if the defect detection portion 140dp determines that exposed aluminum is present/imaged in an area of a workpiece that is expected to include only exposed copper, the defect detection portion 140dp may determine that a defect is present in that area. As another example, a workpiece may include one or more portions on which a paint or coating is applied, where chips or scratches in the paint or coating, or problems with the painting or coating, may expose an underlying material, for which such exposures may be regarded as defects. In general, if the defect detection portion 140dp determines that second material is present/imaged in an area of a workpiece that is expected to include only a first material (e.g., painting, coating, upper layering, etc.), the defect detection portion 140dp may determine that a defect is present in that area.

In various implementations, the defect detection portion 140dp may be configured to determine that a defect is present in a workpiece based on processes which rely at least in part on a plurality of different reflectance profiles of different materials included in a workpiece. Different materials (e.g., copper, aluminum, gold, silver, etc.) are known to have different reflectance profiles (e.g., reflectance versus wavelength curves), and for which the reflectance of each of the materials vary in accordance with corresponding wavelengths of light that are directed to the materials. For example, spectral reflectance profiles of different materials (e.g., silver, copper, aluminum, and carbon steel) may be included in a single graph, to facilitate comparison of the spectral reflectance profiles for which a reflectance of each material at specific wavelengths can be seen (e.g., as one specific example of a graph including some spectral reflectance profiles for comparison, see graph at https://www.researchgate.net/figure/Spectral-reflectance-of-aluminum-and-various-other-metals-O-Elsevier-Reprinted-with_fig1_283437763).

By way of example, in one specific implementation when illuminated with blue light having a wavelength of approximately 450 nanometers (e.g., output from a blue LED), in accordance with certain testing metrics, copper may have a reflectance of around 50%, while aluminum may have a reflectance of around 95%. When illuminated with green light having a wavelength of around 570 nanometers (e.g., output from a green LED), copper may have a reflectance of around 65% while aluminum may have a reflectance of around 92%. When illuminated with red light having a wavelength of approximately 700 nanometers (e.g., output from a red LED), copper may have a reflectance of approximately 96%, while aluminum may have a reflectance of approximately 90%. Other materials (e.g., gold, silver, etc.) have different reflectance properties that may be indicated by corresponding reflectance versus wavelength curves.

Defect detection systems according to various embodiments of the present disclosure may advantageously utilize different reflectance profiles for two or more different materials included in a workpiece that is to be analyzed. For example, two wavelengths (i.e., colors) of light may be selected for illuminating a workpiece that includes two different materials while different color channel image data is acquired, wherein the two wavelengths are selected such that a difference in the values of the reflectance curves for the two different materials for at least one of the wavelengths is relatively large (e.g., approaching a maximum difference within the practical limits of the system) and/or such that a ratio of the differences for the two wavelengths is relatively large. For example, in accordance with the testing metrics noted above, a blue light having a wavelength of approximately 450 nanometers (e.g., output from a blue LED) may be selected to be utilized for which copper may have a reflectance of around 50% and aluminum may have a reflectance of around 95%, for which the difference between 50% and 95% is relatively large and may approach a maximum difference between the reflectance curves (e.g., for wavelengths and other components that may be utilized within the practical limitations of the system). In such an example, for the second wavelength, a red light having a wavelength of approximately 700 nanometers (e.g., output from a red LED) may be selected to be utilized for which copper may have a reflectance of approximately 96% and aluminum may have a reflectance of approximately 90%, for which the blue/red ratio for the reflectance for copper may be approximately 50%/96%=0.52 and for the reflectance of aluminum may be approximately 95%/90%=1.05 (e.g., with the copper ratio far below 1 and the aluminum ratio near or above 1), which is a relatively large ratio difference. As will be described in more detail below, by inputting such different color channel image data to the defect detection portion 140$dp$, the ability to detect defects may be improved. In one implementation, determining ratios between the different color channel image data may provide particularly advantageous characteristics for enabling defects to be detected, for example, as noted below with respect to FIG. 8F.

In various implementations, a monochrome camera may offer the highest XY resolution (e.g., as compared to a color camera for which each color image may include only some of the pixels of the camera that are designated for that color, such as when a Bayer filter is utilized). In some implementations, red, green, and/or blue LEDs are used to capture monochrome images of a workpiece (e.g., for which the LEDs may be selected according to specific desired wavelengths as noted above). As a specific example, different blue LEDs may be available that provide different blue wavelengths within a blue light range, such as one that corresponds to 430 nanometers, another that corresponds to 440 nanometers, and another that corresponds to 450 nanometers. In accordance with the above example, the blue LED corresponding to 450 nanometers may be selected for utilization in the system in order to achieve the desired ratios and/or other characteristics of the system, etc. in accordance with the reflectance profile values for the copper and aluminum at 450 nanometers (e.g., which may approach and/or otherwise approximately correspond to a maximum difference between the reflectance curves, as opposed to 430 nanometers or 440 nanometers which may correspond to smaller relative reflectance differences between the reflectance of copper and aluminum). Similarly, different red LEDs may be available that provide different red wavelengths within the red light range, such as one that corresponds to 650 nanometers, another that corresponds to 675 nanometers, and another that corresponds to 700 nanometers, for which in accordance with the above example the red LED corresponding to 700 nanometers may be selected for utilization in the system in order to achieve the desired ratios, etc.

In regard to such examples, it will be appreciated that in some implementations LEDs and/or other light sources may be characterized by a single wavelength but may output a spectrum with a corresponding spectral bandwidth (e.g., in some instances of less than 60 nanometers, etc.) For example, certain LEDs may be relatively narrowband emitters which output a spectrum with an approximately Gaussian shape. In various implementations, the single wavelength that is used to characterize such light sources may be based on a characterizing wavelength, such as a peak wavelength of the corresponding spectrum, a center wavelength of the corresponding spectrum, a centroid wavelength of the corresponding spectrum, or a dominant wavelength of the corresponding spectrum, etc. It will be appreciated that in such instances, the light source outputs light with the characterizing wavelength, and also outputs light with the other wavelengths of the corresponding surrounding spectrum.

In operation, each monochrome image may be captured while one of the red, green, or blue LEDs outputs light. Such monochrome images may be used to generate a synthetic RGB image of the workpiece, wherein the image data of the synthetic RGB image includes a plurality of red pixel values corresponding to a monochrome image captured while the workpiece is illuminated by only the red LED, a plurality of green pixel values corresponding to a monochrome image captured while the workpiece is illuminated by only the green LED, and a plurality of blue pixel values corresponding to a monochrome image captured while the workpiece is illuminated by only the blue LED. In some implementations, only the blue and red LEDs are used to capture monochrome images for producing a synthetic monochrome image of a workpiece, wherein the image data of the synthetic monochrome image may correspond to a plurality of pixels having values that are based on a ratio of pixel values of a monochrome image captured while the workpiece is illuminated by only the blue LED and pixel values of a monochrome image captured while the workpiece is illuminated by only the red LED. In various implementations, a defect mask image may be drawn or otherwise determined (e.g., on a synthetic image) to identify defects for training of the defect detection portion 140dp.

In one or more implementations, the light source 230 of the vision components portion 200 of the workpiece inspection and defect detection system 100 includes a plurality of LEDs that respectively output light having a plurality of different colors (i.e., wavelengths) corresponding to a plurality of color channels, wherein each color channel corresponds to a different color. In various implementations, each of the LEDs may have a wavelength range of greater than 25 nanometers but less than 60 nanometers (e.g., such as a wavelength range of 50 nanometers). For example, the light source 230 may comprise a light source configuration that includes a first LED that provides a first color light, a second LED that provides a second color light, and a third LED that provides a third color light. Although the light source 230 is configured to provide the first color light, second color light, and third color light, a subset thereof may be selected based on the reflectance profiles (e.g., spectral reflectance curves) of materials included in workpieces. For example, the first color light and second color light may be selected to be utilized and the third color light may not selected to be utilized for inspecting workpieces with first and second materials based on the reflectance profiles of the first and second materials. The first color light and second color light may be selected to obtain a relatively large difference between the values and/or ratios for the different materials for the first color light and second color light. In that regard, as noted above it may be desirable to select the wavelengths of light that are utilized for illumination of a workpiece including different materials, with respect to reflectance versus wavelength data for the particular materials included in the workpiece to be inspected, in order to select two colors (i.e., wavelengths) that will provide a desired large difference between the values and/or ratios for the different materials for the first color light and second color light. Additionally, the third color light may be selected to be utilized for inspecting workpieces with a third material based on a reflectance profile of the third material which is different than the first and second reflectance profiles. For example, the first color light and the second color light may be selected for a workpiece including a first material and a second material, and the first color light and the third color light may be selected for a workpiece including the first material and a third material.

As described above, a multilayer workpiece may include a plurality of materials, wherein each material may have a different spectral reflectance profile. Accordingly, each material may reflect light differently depending on the wavelength (i.e., color) of light that illuminates the material. Thus, if a multilayer workpiece including an aluminum substrate covered by a layer of copper, for example, is imaged while illuminated with light having a wavelength at which aluminum has a relatively high reflectance and copper has a relatively low reflectance, a resulting image would have pixels with relatively high values in each area in which aluminum is exposed, if any. For example, if aluminum and copper are illuminated by blue light having a wavelength between 450 and 495 nanometers, in accordance with certain testing metrics aluminum may have a relative reflectance of approximately 80% and copper may have a relative reflectance of less than 40% (e.g., for which aluminum may have approximately twice the reflectance of copper). As will be described in more detail below, in various implementations, if color image data including blue image data and red image data are captured, a ratio of the blue image data to the red image data may be more sensitive to the presence of a defect than the color image data itself.

In some implementations, a camera configuration including a camera may be utilized with different color planes for producing a multicolor image. As defined herein, such different color planes of a camera may each correspond to a different color image with corresponding different color channel image data. More specifically, a camera that produces a blue color plane, green color plane, and a red color plane, may be defined herein as producing a blue color image, a green color image and a red color image, each with its corresponding color channel image data. In some implementations, the different color planes may each be described or otherwise defined as an image plane, for which each such image plane is considered herein to correspond to a different color image with corresponding color channel image data that is produced. Accordingly, for each of a plurality of sets of training mode workpiece image data, corresponding first color channel training mode workpiece image data (e.g., corresponding to an image similar to the image shown in FIG. 8A) and corresponding second color channel training mode workpiece image data (e.g., corresponding to an image similar to the image shown in FIG. 8C) may be produced by respective first and second camera image planes. Additionally, for each of a plurality of sets of run mode workpiece image data, corresponding first color channel run mode workpiece image data (e.g., corresponding to an image similar to the image shown in FIG. 8A) and corresponding second color channel run mode workpiece image data (e.g., corresponding to an image similar to the image shown in FIG. 8C) may be produced by the respective first and second camera image planes.

In various implementations, an RGB color camera, which generates red image data, green image data, and blue image data (i.e., RGB image data), may be used to image a workpiece. For example, the RGB camera may capture a first image of the workpiece while the workpiece is illuminated with blue light output from a blue LED, and then capture a second image of the workpiece while the workpiece is illuminated with red light output from a red LED. As noted above, the particular blue and red LEDs that are used may be selected such that the light output from the blue LED and the light output from the red LED achieve desired ratios and/or other characteristics of the system. Such implementations take into consideration the reflectance spectras of copper and aluminum in visible wavelengths of light. In some implementations, the light output from the blue LED and the light output from the red LED are approximately as short and as long, respectively, as the sensitivity of the RGB camera permits.

In various implementations, the sensitivity of the defect detection portion 140dp may be optimized by choosing a red LED that outputs red light with a characterizing wavelength centered at a point where the reflectance of copper and aluminum are approximately the same (i.e., isosbestic point). Also, a blue LED may be chosen that outputs blue light with a characterizing wavelength that maximizes the difference between the reflectance of copper and aluminum (e.g., while staying within the wavelengths passed by a blue filter in an RGB Bayer filter machine vision camera and/or otherwise within the practical limits/limitations of the system).

In various implementations, it is desirable to select color lights that correspond to each of a plurality of different color channels according to wavelengths that produce the greatest or otherwise desirable ratios or other characteristics between the two color channels (e.g., blue and red color channels) so that the two materials (e.g., copper and aluminum) can be best distinguished from one another in run mode images, so as to enable the defect detection portion 140dp to be best trained and also have the best possible capabilities for identifying defects as part of the run mode process (e.g., where similar blue and red images are produced for obtaining the color ratios). Once the two different color wavelengths are determined that provide the desired/best ratios, different configurations may be utilized for achieving the system with the different color wavelengths for the different color channels. With respect to color channels as defined herein, such may be produced through utilization of different color light sources (e.g., separate LEDs for each color), or different filters, or any other known techniques that may be utilized for producing or filtering different color light such as may be utilized for different color channels in accordance with principles as described herein.

For example, as part of a manufacturing process, LEDs or other light sources may be selected and included that produce the desired wavelengths for the desired ratios for the images. As another example, different color filters may be selected that pass the desired wavelengths for the corresponding color channels. In some instances, such filters may be tunable or otherwise adjustable, in order to achieve the desired wavelengths. In some implementations, different filters that may be available may be rotated or otherwise inserted in the system for selecting the desired wavelengths. For example, in some implementations, each such color filter may pass a spectral bandwidth of less than 40 nanometers, or less than 20 nanometers, etc., for determining the wavelengths for the respective color channels.

In various implementations, a monochrome camera that generates monochrome image data may be used to image a workpiece. For example, using a step and repeat procedure, the camera may step to a location, settle at the location, capture two images including a first image while the workpiece is illuminated by red light (e.g., from a red LED) and a second image while the workpiece is illuminated by blue light (e.g., from a blue LED), and then repeat the procedure. The defect detection portion 140dp then utilizes the images for training and/or run mode analysis (e.g., for which ratios of the image data of the two images may be determined, etc.). Such implementations utilizing monochrome images may have the advantage of better spatial resolution, compared to implementations that use a Bayer filter. Also, greater light gathering may be achieved compared to implementations that use a Bayer filter, however, this effect may be relatively small compared to implementations that use a Bayer filter along with two narrow band LEDs that are well within the Bayer filter's pass wavelengths. While implementations in which a Bayer filter is not used may be constrained by the sensitivity of the camera, they are not constrained by a Bayer filter's pass wavelengths, which advantageously maximizes freedom to choose desired wavelengths (e.g., in accordance with reflectance profiles of workpiece materials, etc.). However, image acquisition time in such implementations may in some instances be slower (e.g., approximately two times slower in some instances) due to additional time required at each location in order to acquire two different images for the two color channels.

In order to improve image acquisition time, in various implementations a monochrome camera that includes two image sensors may be used to image a workpiece. For example, the monochrome camera may be a multi-sensor prism-based multispectral area scan camera (e.g., such as is commercially available from JAI Corporation), which may include predefined configurations of visible and near-infrared (NIR) wavebands, or a configuration tailored to application requirements with two or three custom wavebands. In various implementations, utilization of such a monochrome camera may provide full resolution and also enable custom color pass wavelengths to be selected. Additionally, using such a monochrome camera may enable fast image acquisition in that two images (e.g., for two color channels) may be captured close together in time, including a first image while the workpiece is illuminated by a first color light (e.g., red light from a red LED) and a second image while the workpiece is illuminated by a second color light (e.g., blue light from a blue LED). In such implementations (e.g., or in other implementations utilizing different camera configurations), in the event of movement of the workpiece relative to the system between the acquisition times of the two images (e.g., the workpiece moving on a conveyor relative to the system, etc.) the defect detection portion 140dp may be configured to offset the images so that the pixel data overlaps based on the XYZ positions of each image (e.g., wherein regions of the images that lack overlapping data may be ignored, and for which the overlapping data may be regarded as corresponding to a common field of view between the images).

In various implementations, RGB images may be captured (e.g., for which the image data for the red, green and blue pixels may be regarded as corresponding to respective red, green and blue color channel images), and the defect detection portion 140dp may be configured to use the image data of the RGB images to create a synthetic image with the same resolution or with half of the height and width dimensions (e.g., as will be described in more detail below). Also, the defect detection portion 140dp may be configured to transform each RGB pixel value to a ratio of monochrome pixel values. Additionally, the defect detection portion 140dp may be configured to transform each RGBG quad pixel to a single ratio mono pixel (e.g., as will be described in more detail below).

The defect detection portion 140dp may be configured to apply various kernels in order to generate synthetic images. Table 1 below shows an example of raw image data including four RGBG quad pixels. More specifically, the raw image data includes a first RGBG quad pixel with pixels R1, G1, B1, G1; a second RGBG quad pixel with pixels R2, G2, B2, G2; a third RGBG quad pixel with pixels R3, G3, B3, G3; and a fourth RGBG quad pixel with pixels R4, G4, B4, G4. In various implementations, the red pixels R1, R2, R3 and R4 may be regarded as corresponding to a red color channel image, the green pixels G1, G2, G3 and G4 may be regarded as corresponding to a green color channel image, and the blue pixels B1, B2, B3 and B4 may be regarded as corresponding to a blue color channel image.

TABLE 1

| R1 | G1 | R2 | G2 |
| G1 | B1 | G2 | B2 |
| R3 | G3 | R4 | G4 |
| G3 | B3 | G4 | B4 |

Table 2 below shows an example of coarse resolution synthetic ratio data with four pixels values, which are generated based on the raw image data shown in Table 1. More specifically, the coarse resolution synthetic ratio data includes a first pixel having a value based on B1/R1, a second pixel having a value based on B2/R2, a third pixel having a value based on B3/R3, and a fourth pixel having a value based on B4/R4. In various implementations, for the synthetic ratio data the actual values of each of the pixels may be based on a further calculation that utilizes the respective ratios such as B1/R1, etc. (e.g., such as applying a scaling factor to obtain a value in a range of 0-255 and/or other processes) as will be described in more detail.

TABLE 2

| B1/R1 | B2/R2 |
|---|---|
| B3/R3 | B4/R4 |

Table 3 below shows an example of fine resolution synthetic ratio data with four pixels values, which are generated based on the raw data shown in Table 1. More specifically, the fine resolution synthetic ratio data includes a first pixel having a value based on (B1+B2+B3+B4)/(4*R1), a second pixel having a value based on (B2+B4)/(R2+R1), a third pixel having a value based on (B3+B4)/(R1+R3), and a fourth pixel having a value based on 4*B4/(R1+R2+R3+R4). In various implementations, for the synthetic ratio data the actual values of each of the pixels may be based on a further calculation that utilizes the respective ratios such as (B1+B2+B3+B4)/(4*R1), etc. (e.g., such as applying a scaling factor to obtain a value in a range of 0-255 and/or other processes) as will be described in more detail.

TABLE 3

| (B1 + B2 + B3 + B4)/(4*R1) | (B2 + B4)/(R2 + R1) |
|---|---|
| (B3 + B4)/(R1 + R3) | 4*B4/(R1 + R2 + R3 + R4) |

In various implementations, a Synthetic White Illumination (SWI) may be created and used during illumination of workpieces, wherein the SWI is a combination of red, green, and blue LED illumination values intended to create white light with a desired color balance. Additionally, a customized SWI may be created and used during illumination of workpieces, wherein the customized SWI is a combination of only red and blue LED illumination values for illuminating the workpieces while they are imaged using a color camera (e.g., a color machine vision camera), and for which the wavelengths and/or ratio of red and blue illumination is chosen according to principles as disclosed herein. Similarly, a Synthetic Red Blue Illumination (SRBI) may be created and used during illumination of workpieces. In some implementations, a user may utilize a graphical user interface for selecting one of the above color options and/or other color options for illuminating workpieces with a light source configuration (e.g., utilizing the light source 230, etc.).

FIGS. 7A-7C are examples of images of a portion of a workpiece that includes defects, as may be acquired using a workpiece inspection and defect detection system similar to that of FIG. 1. The workpiece shown in FIGS. 7A-7C has an aluminum substrate with a layer of copper formed over the top of the aluminum substrate. The workpiece shown in FIGS. 7A-7C includes defects 702, 704, 706, and 708, which are encircled for illustrative purposes. In one example, each of the defects 702, 704, 706 and 708 may correspond to exposed aluminum in the corresponding image of the workpiece surface. More specifically, in certain implementations, various types of processing (e.g., drilling, etching, etc.) may accidentally remove too much of the covering copper and/or other issues may occur (e.g., scratches, etc.), such that the aluminum substrate may be exposed, which may be regarded as corresponding to a defect.

The images shown in FIGS. 7A-7C are a set of monochrome images of a workpiece obtained under different lighting conditions and corresponding to a same field of view. More specifically, FIG. 7A is a monochrome image of a portion of the workpiece captured by a monochrome camera while the workpiece is illuminated with blue light, for example, emitted by a blue LED. FIG. 7B is a monochrome image of the portion of the workpiece captured by the monochrome camera while the workpiece is illuminated with green light, for example, emitted by a green LED. FIG. 7C is a monochrome image of the portion of the workpiece captured by the monochrome camera while the workpiece is illuminated with red light, for example, emitted by a red LED.

As can be seen from a comparison of the images of FIGS. 7A, 7B and 7C, certain features within each of the images may appear lighter or darker (e.g., for which the reflectivity of the copper, aluminum, etc. is different in each image in accordance with the color of the light that is utilized to illuminate the workpiece for each image). In various implementations, the image data for each image as described herein comprises a plurality of pixel values, with each pixel value (e.g., comprising a brightness value) corresponding to a pixel of the image. Pixels in a same location or otherwise imaging a same surface point on a workpiece in different images may be designated as corresponding pixels between the images with different corresponding pixel values (e.g., for which the different corresponding pixel values may result from the different color light utilized to illuminate the workpiece for each image).

FIG. 7D is an example of a synthetic image (e.g., generated based on the image data of the images of FIGS. 7A-7C). More specifically, FIG. 7D is a synthetic color image that is based on image data including red, green, and blue color information (e.g., wherein the red color information may correspond to the monochrome image shown in FIG. 7C, the green color information may correspond to the monochrome image shown in FIG. 7B), and the blue color information may correspond to the monochrome image shown in FIG. 7A). Synthetic color images such as the synthetic color image shown in FIG. 7D may be useful to a user, for example, to aid in the viewing and/or inspecting of portions of the workpiece, etc.

FIG. 7E is an example of an image of a defect mask that may be based on the synthetic image of FIG. 7D (e.g., and/or may be based on one or more of the images of FIGS. 7A-7C, etc.) In various implementations, the defect mask may be hand drawn (e.g., as will be described in more detail below) and/or otherwise provided by a user or by automatic processes for identifying defects. The image shown in FIG. 7E is an example of one of a plurality of images including image data that may be used to train a model utilized by the defect detection portion 140dp to determine whether a workpiece includes a defect. In various implementations, in order to train the model, the user may classify each training image included in a set of training images as non-defect or defect. Accordingly, any of the images shown in FIGS. 7A-7D may be classified as defect (e.g., for which the workpiece surface in the image includes one or more defects).

As part of a hand drawing process, the user may mark pixels (e.g., using a selector of a user interface) that correspond to each defect in the image (e.g., marking pixels of a transparent layer overlaid on the original image using paint-like tools to create an image whose colored pixels correspond to the matching defect pixels in the original image, such as illustrated in the example of FIG. 7E). For example, as part of the image data, the user sets values of pixels included in each of the defects 702, 704, 706, and 708 in the image shown in FIG. 7E to a predetermined value (e.g., 255) in order mark the pixels that correspond to each defect. The user then causes the defect detection portion 140*dp* to utilize image data corresponding to each of the training images in the training mode (e.g., including any defect masks) for training the defect detection portion 140*db*, for example, by making one or more selections using a graphic user interface. After the defect detection portion 140*db* has been trained using the image data from the set of training images (e.g., including the image shown in FIG. 7E), the user may cause the defect detection portion 140*dp* to operate in the run mode in order to detect defects included in a set of run mode images generated under similar conditions (e.g., same lighting conditions and/or synthetic image generation process, etc.) as the set of training mode images used to train the defect detection portion 140*dp*.

The images shown in FIGS. 7A-7E may be regarded as examples of both training mode and run mode images. In one example implementation, the image data for some or all of the images shown in FIGS. 7A-7E may be included as part of a set of training mode image data for training the defect detection portion 140*dp* (e.g., for which a set of image data may comprise image data from images corresponding to a same field of view of a workpiece, etc.). Also, some or all of the images of FIGS. 7A-7D may be regarded as examples of run mode images which may be analyzed by the defect detection portion 140*dp* to determine if each image should be classified as a defect image or a non-defect image.

Figure 8A:
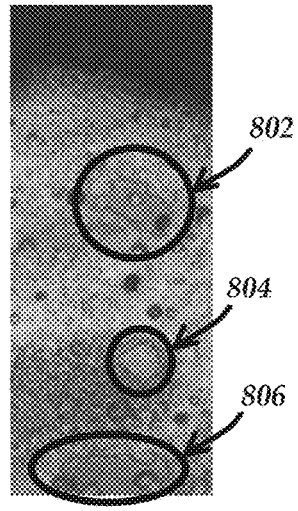
FIGS. 8A-8C are examples of images of portions of a workpiece that includes defects, as may be acquired using a workpiece inspection and defect detection system similar to that of FIG. 1.
Figure 8B:
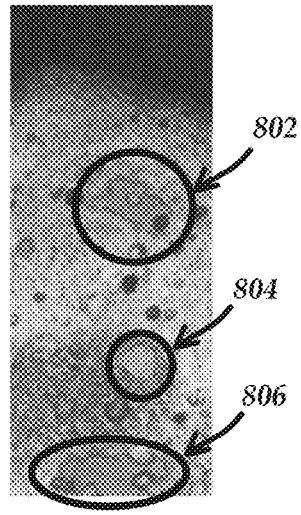
Figure 8C:
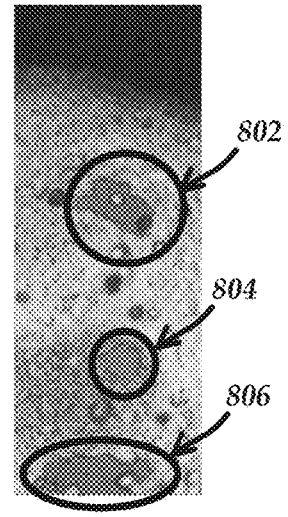

FIGS. 8A-8C are examples of images of portions of a workpiece that includes defects, as may be acquired using a workpiece inspection and defect detection system similar to that of FIG. 1. The workpiece shown in FIGS. 8A-8C has an aluminum substrate with a layer of copper formed over the top of the aluminum substrate. The workpiece shown in FIGS. 8A-8C includes defects 802, 804, and 806, which are encircled for illustrative purposes (e.g., for which each of the defects may correspond to exposed aluminum, similar to the examples of FIG. 7A-7C).

The images shown in FIGS. 8A-8C are a set of monochrome images of a workpiece obtained under different lighting conditions and corresponding to a same field of view. More specifically, FIG. 8A is a monochrome image of a portion of the workpiece captured by a monochrome camera while the workpiece is illuminated with blue light, for example, emitted by a blue LED. FIG. 8B is a monochrome image of the portion of the workpiece captured by the monochrome camera while the workpiece is illuminated with green light, for example, emitted by a green LED. FIG. 8C is a monochrome image of the portion of the workpiece captured by the monochrome camera while the workpiece is illuminated with red light, for example, emitted by a red LED.

In one example, the images shown FIGS. 7A-7C include defects in a first portion of a workpiece, and the images shown FIGS. 8A-8C include defects in a second portion of the workpiece. In another example, the images shown FIGS. 7A-7C include defects in a portion of a first workpiece, and the images shown FIGS. 8A-8C include defects in a portion of a second workpiece. As noted above, in various implementations, the image data for each image as described herein comprises a plurality of pixel values (e.g., with each pixel value corresponding to a pixel of the image, and for which pixels in a same location or otherwise imaging a same surface point on a workpiece in different images may be designated as corresponding pixels between the images with different corresponding pixel values).

Figure 8D:
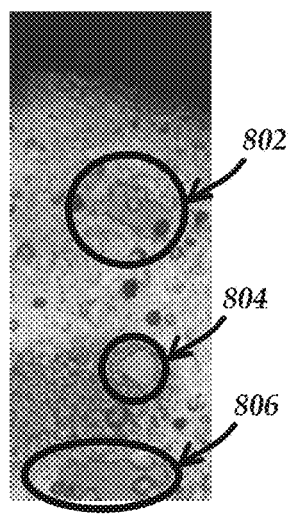
FIG. 8D is an example of a synthetic image generated based on the images of FIGS. 8A-8C.

FIG. 8D is an example of a synthetic image (e.g., generated based on the image data of the images of FIGS. 8A-8C). More specifically, FIG. 8D is a synthetic color image that is based on image data including red color information, green color information, and blue color information (e.g., wherein the red color information may correspond to the monochrome image shown in FIG. 8C, the green color information may correspond to the monochrome image shown in FIG. 8B, and the blue color information may correspond to the monochrome image shown in FIG. 8A). Color images such as the color image shown in FIG. 8D may be useful to a user, for example, to aid in the viewing and/or inspecting of portions of the workpiece, etc.

Figure 8E:
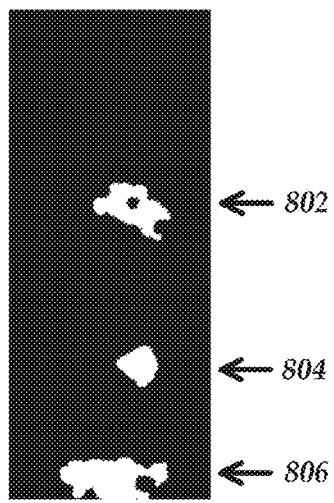
FIG. 8E is an example of an image of a defect mask.
Figure 8F:
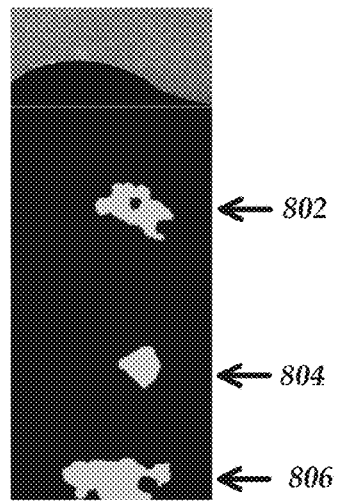
FIG. 8F is an example of a synthetic image generated based on the images of FIGS. 8A and 8C.

FIG. 8E is an example of an image of a defect mask that is based on the synthetic image shown in FIG. 8D or the synthetic image shown in FIG. 8F (e.g., and/or may be based on one or more of the images of FIGS. 8A-8C, etc., similar to the defect mask of FIG. 7E). The image shown in FIG. 8E is an example of one of many images including image data that may be used to train a model utilized by the defect detection portion 140*dp* to determine whether a workpiece includes a defect. In order to train the model, the user may classify each of a plurality of training images as non-defect or defect. Accordingly, any of the images shown in FIGS. 8A-8D may be classified as defect (e.g., for which the workpiece surface in the image includes one or more defects). Next, the user may mark pixels that correspond to each defect in each defect image (e.g., marking pixels of a transparent layer overlaid on the original image using paint-like tools to create an image whose colored pixels correspond to the matching defect pixels in the original image). For example, as part of the image data, the user may set values of pixels included in each of the defects 802, 804, and 806 in the image shown in FIG. 8E to a predetermined value (e.g., 255) in order mark the pixels that correspond to each defect.

After the defect detection portion 140*db* has been trained using image data from a set of training images (e.g., including the image shown in FIG. 8E), the user may cause the defect detection portion 140*dp* to operate in the run mode in order to detect defects included in a set of run mode images generated under similar conditions (e.g., same lighting conditions and/or synthetic image generation process, etc.) as the set of training mode images used to train the defect detection portion 140*dp*. It is noted that in various implementations, defect masks such as those of FIGS. 7E and 8E (which may be hand drawn by a user or otherwise generated to help the defect detection portion 140*dp* learn the characteristics of defects) may not be included as part of run mode images, since during a run mode, the defect detection portion 140*dp* detects the defects, without the user or another process making a hand-drawn defect mask. More specifically, in various implementations, such defect masks may be primarily used for training and training images rather than run mode images.

FIG. 8F is an example of a synthetic image (e.g., a monochrome image) generated based on the images of FIGS. 8A and 8C, as will be described in more detail below. The image shown in FIG. 8F is another example of one of a plurality of images that may be used as a training image for which the image data may be used to train a model utilized by the defect detection portion 140*dp* to determine whether a workpiece includes a defect, or a run mode image to be analyzed by the defect detection portion 140*dp* to determine whether a workpiece includes a defect. In order to train the model, the user may classify the image shown in FIG. 8F as a defect image. After the defect detection portion 140*db* has been trained using image data from a set of training images (e.g., including the image shown in FIG. 8F), the user may cause the defect detection portion 140*dp* to operate in the run mode in order to detect defects included in a set of run mode images generated under similar conditions (e.g., same lighting conditions and/or synthetic image generation process, etc.) as the set of training mode images used to train the defect detection portion 140*dp*.

The synthetic image shown in FIG. 8F is based on image data including a plurality of pixel values, wherein each of the pixel values is generated using a scaling factor and a ratio of corresponding pixel values included in image data of the images shown in FIGS. 8A and 8C, which are acquired while a workpiece is illuminated with blue light and red light, respectively, as described above. Examples are provided below of how pixel values included in image data corresponding to the synthetic image shown in FIG. 8F (e.g., a monochrome image) may be calculated or otherwise determined. For simplicity of the illustration of FIG. 8F, the exposed aluminum defects 802, 804 and 806 are illustrated as clearly distinguished from the surrounding copper surface portions (e.g., somewhat similar to the defect mask of FIG. 8E), for which the process as described below for forming FIG. 8F is intended to better distinguish the exposed aluminum defects relative to the copper surface portions (e.g., as compared to FIGS. 8A-8D), and for which the resulting contrast between the features in corresponding formed synthetic images may generally depend on various factors (e.g., including the characteristics of the workpiece surface features in the images, etc.).

In one specific example, a first pixel of the image shown in FIG. 8A (e.g., as illuminated by the blue light and as corresponding to a copper surface portion and/or surface point of the workpiece) may have a value (e.g., a brightness value) of 100, and a corresponding first pixel of the image shown in FIG. 8C (e.g., as illuminated by red light and as corresponding to the same copper surface portion and/or surface point of the workpiece) may have a value (e.g., a brightness value) of 200. In various implementations and under certain conditions, the 100/200 ratio may indicate that the reflectivity of the copper under the blue light is approximately 0.5 times the reflectivity of the copper under the red light (e.g., assuming the reflectivity and brightness as indicated by the pixel values are approximately linearly related, as will be described in more detail below). The defect detection portion 140*dp* may be configured to calculate an intermediate blue-to-red ratio value by dividing 100 by 200 (i.e., 100/200=0.5). The defect detection portion 140*dp* may be configured to scale the intermediate blue-to-red ratio using a scaling factor to obtain a value in a range of 0-255, which corresponds to a range of values that may be included in a byte brightness value (e.g., of a monochrome image, an RGB image, or other image). Assuming that a maximum ratio value is defined to have a value of 1.5 and a minimum ratio value is defined to have a value of 0.1, the defect detection portion 140*dp* may be configured to calculate a ratio scale value by subtracting 0.1 from 1.5 (i.e., 1.5-0.1=1.4). Also, the defect detection portion 140*dp* may be configured to scale the intermediate blue-to-red ratio value using the scaling factor by first subtracting the minimum ratio value from the intermediate blue-to-red ratio value (i.e., 0.5-0.1=0.4), then multiplying that value by a ratio of the maximum byte value minus 1 divided by the ratio scale value (i.e., 0.4*(255-1)/1.4=72), and then adding 1 to the result (72+1=73). Accordingly, the defect detection portion 140*dp* may be configured to determine that a corresponding first pixel of the synthetic image has a value of 73 (i.e., as part of the image data for the synthetic image).

In another example, a second pixel of the image shown in FIG. 8A (e.g., as illuminated by the blue light and as corresponding to an exposed aluminum surface portion and/or surface point of the workpiece, as may correspond to a defect in accordance with the above examples) may have a value of 190 and a corresponding second pixel of the image shown in FIG. 8C (e.g., as illuminated by red light and as corresponding to the same exposed aluminum surface portion and/or surface point of the workpiece) may have a value of 180. In various implementations and under certain conditions, the 190/180 ratio may indicate that the reflectivity of the aluminum under the blue light is about 1.055555 times the reflectivity of the aluminum under the red light (e.g., assuming the reflectivity and brightness as indicated by the pixel values are approximately linearly related, as will be described in more detail below). The defect detection portion 140*dp* may be configured to calculate an intermediate blue-to-red ratio value by dividing 190 by 180 (i.e., 190/180=1.055555). The defect detection portion 140*dp* may be configured to scale the intermediate blue-to-red ratio using a scaling factor to obtain a value in a range of 0-255, which corresponds to a range of values that may be included in a byte brightness value (e.g., of a monochrome image, an RGB image, or other image). Similar to the process described above for the first pixel, assuming that a maximum ratio value is defined to have a value of 1.5 and a minimum ratio value is defined to have a value of 0.1, the defect detection portion 140*dp* may be configured to calculate a ratio scale value by subtracting 0.1 from 1.5 (i.e., 1.5-0.1=1.4). Also, the defect detection portion 140*dp* may be configured to scale the intermediate blue-to-red ratio value using the scaling factor by first subtracting the minimum ratio value from the intermediate blue-to-red ratio value (i.e., 1.055555-0.1=0.9555555), then multiplying that value by a ratio of the maximum byte value minus 1 divided by the ratio scale value (i.e., 0.9555555*(255-1)/1.4=173), and then adding 1 to the result (173+1=174). Accordingly, the defect detection portion 140*dp* may be configured to determine that a corresponding second pixel of the synthetic image has a value of 174 (i.e., as part of the image data for the synthetic image).

In various implementations, similar calculations may be performed for determining the remaining values for the pixels as part of the image data for the synthetic image (e.g., such as the image of FIG. 8F). Similar processes may also be utilized for determining the pixel values as part of the image data for other types of synthetic images, such as the synthetic images of the examples of Tables 2 and 3 above. More specifically, for each of the ratios of Tables 2 and 3 (e.g., B1/R1, (B1+B2+B3+B4)/(4*R1), (B2+B4)/(R2+R1), etc.) a scaling calculation (utilizing a scaling factor and/or other calculations) may be applied to each of the respective ratios to determine the values for the respective pixels of the synthetic image.

As noted above, in some instances, the reflectivity and brightness (e.g., as indicated by the pixel values) be may approximately linearly related. More specifically, in various implementations, to a first order, reflectivity and brightness may be approximately linearly related (e.g., with a high level of correlation). To a second order (e.g., if the workpiece surface is optically rough), there may be a scattering of light, for which the reflectivity and brightness relationship may have some amount of variance. For an application such as described for the examples above (e.g., in which a defect is defined as the presence of exposed aluminum on a workpiece surface where copper is expected), it may be preferable to use a blue-to-red ratio rather than a red-to-blue ratio (e.g., for the generation of the synthetic image of FIG. 8F or otherwise). Such may be preferable in that it may be desirable for the divisor of the ratio to be a relatively larger number (e.g., a 200 brightness value for copper for the divisor) near a defect location, which minimizes the influence of camera noise on the ratio value (e.g., and on a corresponding ratio synthetic image, such as that of FIG. 8F). For example, if a blue-to-red ratio is utilized and a red channel copper pad has a brightness of 200, with noise of +/−1, then a ratio of blue channel value to red channel value might be (blue channel value/199) or (blue channel value/200) or (blue channel value/201), for which the influence of the noise is relatively small. Conversely, if a red-to-blue ratio were utilized and a blue channel on copper averages a brightness of 100, with noise of +/−1, then the ratio might be (red channel value/99) or (red channel value/100) or (red channel value/101), wherein the influence of noise would undesirably be approximately two times as great.

It will be appreciated that generated synthetic image data (e.g., a ratio synthetic image data) of an image such as that of FIG. 8F (e.g., a ratio synthetic image) may enable the defect detection portion 140dp to more accurately detect defects. More specifically, in accordance with the above examples, the difference in the example blue-to-red ratios for the copper and aluminum (e.g., with the blue-to-red ratio for the copper of 0.5 and for the aluminum of 1.055555), and the example ratio pixel values of 73 for the copper and 174 for the aluminum (e.g., which are noted to have large value differences as well as large percentage differences), may assist the defect detection portion 140dp in being able to better distinguish the aluminum from the copper (e.g., in a corresponding training image and/or in a corresponding run mode image). In an implementation where exposed aluminum corresponds to a defect, such processes and synthetic images may correspondingly enable the defect detection portion 140dp to better detect defects.

In various implementations, the synthetic image generation process described above may be used to generate both training mode images that are used to train the defect detection portion 140dp and run mode images that are analyzed by the defect detection portion 140dp. More specifically, for each of a plurality of sets of training mode workpiece image data including first color channel training mode workpiece image data (e.g., similar to the image data of the image shown in FIG. 8A) and second color channel training mode workpiece image data (e.g., similar to the image data of the image shown in FIG. 8C), the defect detection portion 140dp determines, for each pixel value of the first color channel training mode workpiece image data, a ratio between that pixel value and a corresponding pixel value of the corresponding second color channel training mode workpiece image data. Additionally, for each of a plurality of sets of run mode workpiece image data including first color channel run mode workpiece image data (e.g., similar to the image data of the image shown in FIG. 8A) and second color channel run mode workpiece image data (e.g., similar to the image data of the image shown in FIG. 8C), the defect detection portion 140dp determines, for each pixel value of the corresponding first color channel run mode workpiece image data, a ratio between that pixel value and a corresponding pixel value of the corresponding second color channel run mode workpiece image data. Accordingly, the defect detection portion 140dp utilizes, for each set of training mode workpiece image data, the ratios of the pixels of the corresponding first and second color channel training mode workpiece image data to determine corresponding pixel values for corresponding training mode synthetic image data that is utilized for training the defect detection portion. Also, the defect detection portion 140dp utilizes, for each set of run mode workpiece image data, the ratios of the pixels of the corresponding first and second color channel run mode workpiece image data to determine corresponding pixel values for corresponding run mode synthetic image data (e.g., which the trained defect detection portion analyzes to determine defect images that include workpieces with defects).

In various implementations, utilizing ratio synthetic monochrome image data of images such as the one shown in FIG. 8F may be preferable to utilizing image data of images such as the ones shown in FIGS. 8A-8D for detecting defects in images. In some instances, taking the ratio of blue pixel values to red pixel values to create image data for a synthetic monochrome image (e.g., as described above in connection with FIG. 8F) may be beneficial in that the resulting synthetic monochrome image data may improve the ability of the defect detection portion 140dp to distinguish different materials, which may improve defect detection. For example, the defects 802, 804, and 806 may be more detectable in the synthetic monochrome image data of the image shown in FIG. 8F than in the image data of the images shown in FIGS. 8A-8D.

The workpiece in the example of FIG. 8F is described as including at least two different materials (e.g. copper and aluminum), and for which producing image data for a synthetic monochrome image based on a ratio of pixel values as described above may also aid in robustly distinguishing more than two materials. For example, producing image data for a synthetic monochrome image based on a ratio of pixel values may also aid in detecting black plastic molding that may be included in a workpiece, or other aspects such as areas that are bright or dark as a result of other surface features (e.g., divots, etc.). In regard to such additional materials and/or aspects, it may be desirable to distinguish first and second materials (e.g., copper and aluminum) from each other, and to also be able to distinguish those materials from the additional materials and/or features (e.g., black plastic molding, divots, etc.) that may also be included in an image. Similar to the copper and aluminum, the additional materials may also have ratios determined which have large value differences as well as large percentage differences, as may assist the defect detection portion 140dp in being able to better distinguish the additional materials from the aluminum and/or the copper (e.g., due in part to the reflectance profiles of the additional materials and the corresponding reflectance at the blue and red wavelengths, etc.).

As set forth above, in various implementations, a user may produce a hand drawn defect mask based on viewing and marking of a synthetic monochrome image, for example, the synthetic monochrome image shown in FIG. 8F, which is generated based on a ratio of blue and red pixel values of the image data of the images shown in FIGS. 8A and 8C, respectively. Also, in various implementations, a user may produce a hand drawn defect mask based on viewing and marking of a synthetic RGB image, for example, red, green, and blue pixel values of the synthetic RGB image shown in FIG. 8D. In addition, a user may produce a hand drawn defect mask based on viewing and marking of other images, for example, the images shown in FIG. 8A, 8B, or 8C.

As noted above, in various implementations, the images shown in FIGS. 8A-8F may be regarded as examples of both training mode and run mode images. In one example implementation, some or all of the image data of the images of FIGS. 8A-8F may be examples of image data included as part of a set of training mode workpiece image data for training the defect detection portion 140dp (e.g., for which a set of image data may comprise image data from images corresponding to a same field of view, etc.). Also, the images of FIGS. 8A-8D and/or FIG. 8F may be examples of run mode images for which the image data may be analyzed by the defect detection portion 140dp to determine if the corresponding image should be classified as a defect image or a non-defect image. While the images of FIGS. 7A-7E and 8A-8F are described herein as being possible examples of both training mode and run mode images, it will be appreciated that the training mode and run mode may in general utilize different images. More specifically, during a training mode, training mode images (i.e., with corresponding training mode image data) may be acquired for training the defect detection portion 140dp, while at a later time, during a run mode (e.g., during manufacturing operations for producing workpieces), different run mode images (i.e., with corresponding run mode image data) may be acquired to be analyzed and/or otherwise utilized as part of the analysis by the defect detection portion 140dp to determine defect images that include workpieces with defects. In general, training mode images may be captured using specified imaging, lighting, and workpiece conditions, while the run mode images may be acquired utilizing similar (e.g., approximately equivalent) specified imaging, lighting, and workpiece conditions (e.g., and may be captured utilizing the same or similar equipment and/or components, etc., such as a same or similar light source configuration, lens configuration and/or camera configuration, etc.).

In various implementations, a user interface may be provided, in which a user may be provided with a selection or option for utilizing different color images and/or ratios as described herein for viewing different images and/or training or otherwise utilizing the defect detection portion 140dp. For example, a user may be provided with a user interface with a selection or option for generating and/or viewing a synthetic image (e.g., with blue/red image data such as the synthetic image illustrated in FIG. 8F).

One advantage of only or primarily utilizing image data of synthetic images (e.g., synthetic monochrome images) for training the defect detection portion 140dp during a training mode and/or for analysis during a run mode is that a smaller data set may be included in comparison to utilizing full blue and red image data sets (e.g., for which faster processing may be achieved, etc.). In some implementations, the image data of some or all of the images that are acquired/generated may be provided to the defect detection portion 140dp for training (e.g., the image data of the images of any of FIGS. 8A-8F), for which each image may include at least some unique data for improving the training.

Figure 9:
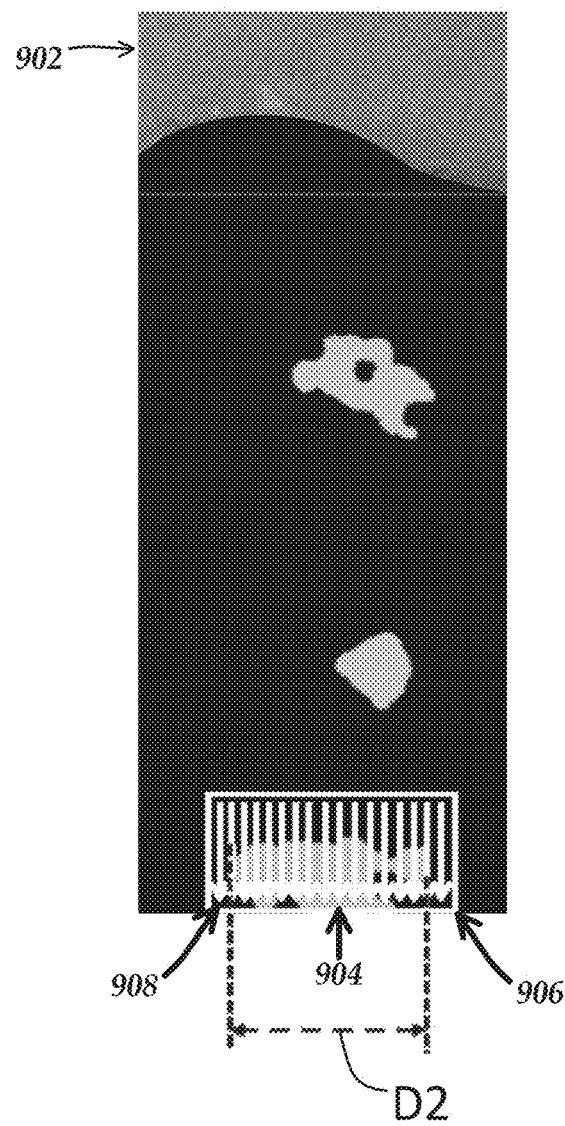
FIG. 9 is a diagram illustrating utilization of one or more video tools for performing metrology operations on an image of a workpiece that includes a defect.

FIG. 9 is a diagram illustrating utilization of one or more video tools for performing metrology operations on an image of a workpiece that includes a defect (e.g., for determining dimensions of the defect, etc.) As illustrated, for an image 902 (e.g., which may be similar or the same as the image of FIG. 8E or 8F) that includes a defect 904 (e.g., which may be similar or the same as the defect 806 shown in FIG. 8E or 8F), a video box tool 906 includes scan lines 908 (e.g., which may also or alternatively be representative of video point tools, etc.) which are utilized for determining the edge locations, dimensions, and/or other aspects of the defect 904. In various exemplary implementations, the video box tool 906 may be sized, positioned and rotated, until the box tool 906 is indicative of, or defines, the region of interest (e.g., the area within the box tool 906), and the arrows shown in FIG. 9 (e.g., representative of scan lines, point tools, etc.) may be utilized to determine the edge(s) of the defect 904. In various exemplary embodiments, the video box tool 906 may generally use one or more conventional edge gradient(s) along the edge(s) of the defect 904 in the region of interest, and the edge(s) of the defect 904 may be determined based on the local magnitudes of the edge gradient(s) along the various scan lines 908, etc.

In various exemplary implementations, such metrology operations may also include performing certain morphological filtering or other filtering (e.g., to distinguish the edges of the defect from other features of the workpiece, for which certain types of such filtering are described in U.S. Pat. No. 7,522,763, which is hereby incorporated herein by reference in its entirety). Various other processes may also or alternatively be performed, such as thresholding and/or forming a binary image (e.g., for forming a defect mask workpiece image such as that of FIG. 8E, on which the metrology operations may be performed). As shown in FIG. 9, in the display area included in the image, the box tool 906 with the scan lines 908 is utilized to determine the edge locations (e.g., the outer edges or perimeter) of the defect 904. Based on such determinations, the video tool and/or other metrology operations may include determining a dimension D2 of the defect (e.g., corresponding to a length or other dimension of the defect 904). In various exemplary implementations, the box tool 906, scan lines 908 and/or other video tools and/or metrology operations may be utilized to determine other dimensions of the defect 904 (e.g., width, depth, etc.) For example, as described above, the video tool portion 143 may include a Z-height measurement tools portion 143z, for which a corresponding video tool or operations may be utilized for determining the Z-height dimensions of the defect 904 (e.g., including determining the depth of the defect relative to other portions or features of the workpiece surface, etc.).

Figure 10:
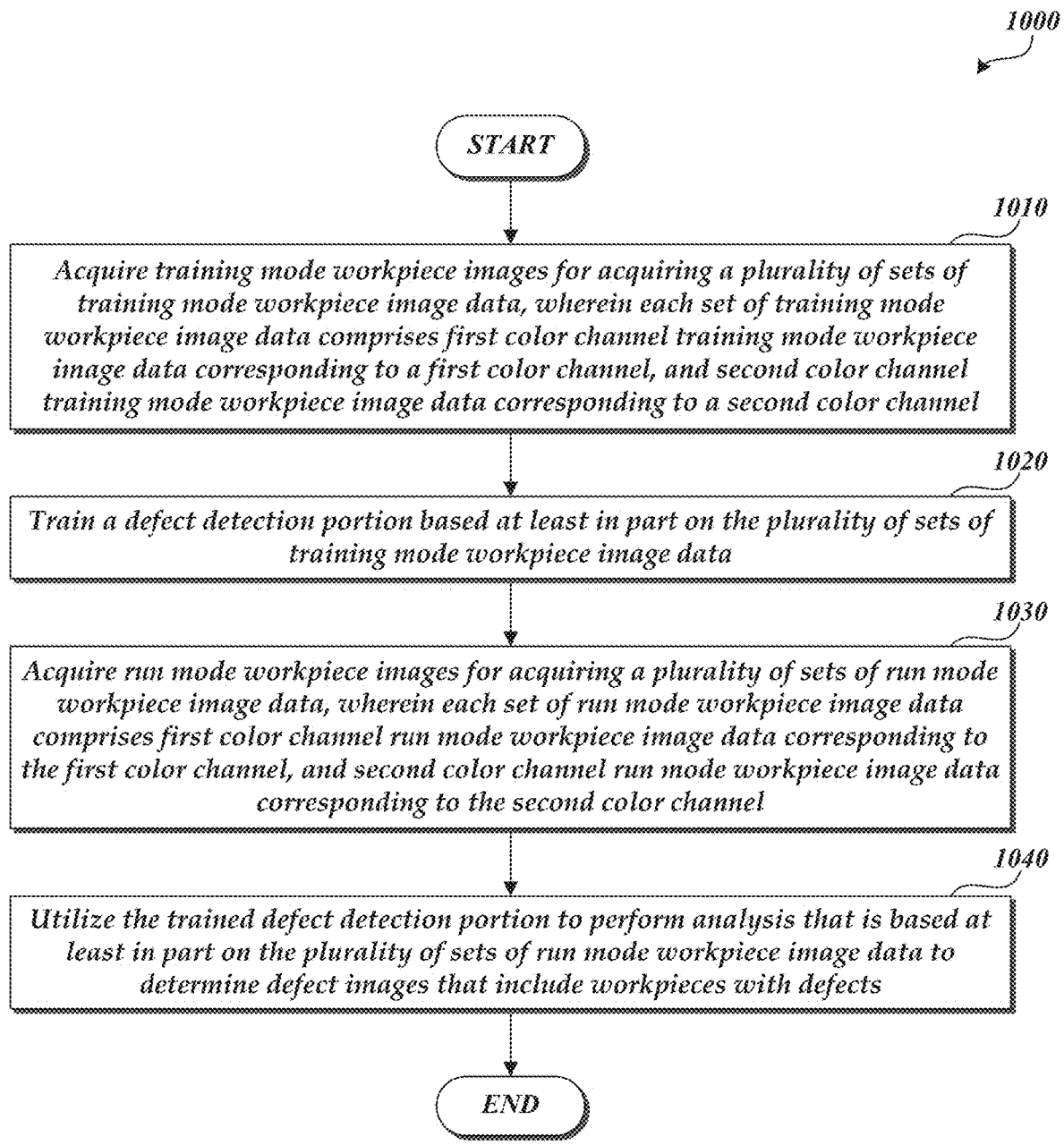
FIG. 10 shows a flow diagram of a method for operating a workpiece inspection and defect detection system similar to that of FIG. 1.

FIG. 10 shows a flow diagram of a method 1000 for operating a workpiece inspection and defect detection system similar to that of FIG. 1. In operation, the workpiece inspection and defect detection system inspects a plurality of workpieces. At least some of the workpieces that are inspected may include first and second materials for which the first and second materials have first and second reflectance profiles (e.g., such that a reflectance of the first material is greater than a reflectance of the second material for a first color light that corresponds to the first color channel, and the reflectance of the second material is greater than or equal to the reflectance of the first material for a second color light that corresponds to the second color channel). For example, at least some of the workpieces that are inspected may include aluminum and copper, which have reflectance profiles such that a reflectance of aluminum may be greater than a reflectance of copper for blue light that corresponds to a blue channel, and the reflectance of the copper may be greater than or equal to the reflectance of aluminum for red light that corresponds to a red color channel.

The method 1000 begins at 1010. At 1010, a workpiece inspection and defect detection system acquires training mode workpiece images for acquiring a plurality of sets of training mode workpiece image data, wherein each set of training mode workpiece image data comprises first color channel training mode workpiece image data corresponding to a first color channel, and second color channel training mode workpiece image data corresponding to a second color channel. For example, the light source 230, the objective lens 250, and the camera configuration 260 of the workpiece inspection and defect detection system 100 may be utilized to acquire a first set of training mode workpiece images including images that are similar to the images shown in FIGS. 7A and 7C (e.g., with each of the images corresponding to a same field of view, such as with the camera configuration 260 and the workpiece in same positions relative to one another), for acquiring a corresponding first set of training mode workpiece image data. Similarly, the light source 230, the objective lens 250, and the camera configuration 260 of the workpiece inspection and defect detection system 100 may be utilized to acquire a second set of training mode workpiece images that are similar to the images shown in FIGS. 8A and 8C (e.g., with each of the images corresponding to a same field of view), for acquiring a corresponding second set of training mode workpiece image data. The method 1000 then proceeds to 1020.

At 1020, a defect detection portion is trained based at least in part on the plurality of sets of training mode workpiece image data acquired at 1010. For example, the defect detection portion 140dp may input image data corresponding to images that are similar to the images shown in FIGS. 7A, 7C, 8A, and 8C, and/or image data corresponding to synthetic images that are generated based on such images (e.g., the image of FIG. 8F), and uses that image data to train a model implemented by the defect detection portion 140dp. The method 1000 then proceeds to 1030.

In various implementations, at 1020, the training of the defect detection portion based at least in part on the plurality of sets of training mode workpiece image data comprises, for each set of training mode workpiece image data, utilizing the corresponding first and second color channel training mode workpiece image data to generate corresponding training mode synthetic image data that is utilized to train the defect detection portion. For example, for a set of training mode workpiece image data corresponding to the images shown in FIGS. 8A and 8C, the defect detection portion 140dp may generate training mode synthetic image data corresponding to the synthetic image shown in FIG. 8F, which is utilized to train the defect detection portion 140dp.

In various implementations, at 1020, for each set of training mode workpiece image data, a plurality of ratios are determined between the corresponding first and second color channel training mode workpiece image data. In various implementations, the determining of the plurality of ratios between the corresponding first and second color channel training mode workpiece image data comprises, for each pixel value of the corresponding first color channel training mode workpiece image data, determining a ratio between that pixel value and a corresponding pixel value of the corresponding second color channel training mode workpiece image data. In various implementations, the training of the defect detection portion based at least in part on the plurality of sets of training mode workpiece image data comprises, for each set of training mode workpiece image data, utilizing the ratios of the pixel values of the corresponding first and second color channel training mode workpiece image data to determine corresponding pixel values for corresponding training mode synthetic image data that is utilized for training the defect detection portion. For example, for a set of training mode workpiece image data corresponding to the images shown in FIGS. 8A and 8C, the defect detection portion 140dp may determine ratios of pixel values between blue color channel image data corresponding to the image shown in FIG. 8A and red color channel image data corresponding to the image shown in FIG. 8C, in order to determine corresponding pixel values for training mode synthetic image data (e.g., corresponding to the synthetic image shown in FIG. 8F), which is utilized to train the defect detection portion 140dp.

At 1030, a workpiece inspection and defect detection system acquires run mode workpiece images for acquiring a plurality of sets of run mode workpiece image data, wherein each set of run mode workpiece image data comprises first color channel run mode workpiece image data corresponding to the first color channel, and second color channel run mode workpiece image data corresponding to the second color channel. For example, the light source 230, the objective lens 250, and the camera configuration 260 of the workpiece inspection and defect detection system 100 (e.g., or similar components with similar operating procedures/conditions as part of the system, such as part of the vision inspection machine 12 and/or vision components portion 200, or a similar vision inspection machine and/or vision components portion as part of the system) may be utilized to acquire a first set of run mode workpiece images including images that are similar to the images shown in FIGS. 7A and 7C (e.g., with each of the images corresponding to a same field of view), for acquiring a corresponding first set of run mode workpiece image data. Similarly, the light source 230, the objective lens 250, and the camera configuration 260 of the workpiece inspection and defect detection system 100 (e.g., or similar components with similar operating procedures/conditions as part of the system) may be utilized to acquire a second set of run mode workpiece images that are similar to the images shown in FIGS. 8A and 8C (e.g., with each of the images corresponding to a same field of view), for acquiring a corresponding second set of run mode workpiece image data. The method 1000 then proceeds to 1040.

At 1040, the defect detection portion trained at 1020 is utilized to perform analysis that is based at least in part on the plurality of sets of run mode workpiece image data acquired at 1030 to determine defect images that include workpieces with defects. For example, the defect detection portion 140dp may determine that an image similar the image shown in FIG. 8F is a defect image that includes a workpiece with a defect. The method 1000 then ends.

In various implementations, at 1040, the utilizing of the trained defect detection portion to perform analysis that is based at least in part on the plurality of sets of run mode workpiece image data to determine defect images that include workpieces with defects comprises, for each set of run mode workpiece image data, utilizing the corresponding first and second color channel run mode workpiece image data to generate corresponding run mode synthetic image data that is analyzed by the trained defect detection portion. For example, for a set of run mode workpiece image data corresponding to the images shown in FIGS. 8A and 8C, the defect detection portion 140dp may generate run mode synthetic image data corresponding to the synthetic image shown in FIG. 8F, which is analyzed by the defect detection portion 140dp after it has been trained.

In various implementations, at 1040, for each set of run mode workpiece image data, a plurality of ratios are determined between the corresponding first and second color channel run mode workpiece image data. In various implementations, the determining of the plurality of ratios between the corresponding first and second color channel run mode workpiece image data comprises, for each pixel value of the corresponding first color channel run mode workpiece image data, determining a ratio between that pixel value and a corresponding pixel value of the corresponding second color channel run mode workpiece image data. In various implementations, the utilizing of the trained defect detection portion to perform analysis that is based at least in part on the plurality of sets of run mode workpiece image data to determine defect images that include workpieces with defects comprises, for each set of run mode workpiece image data, utilizing the ratios of the pixel values of the corresponding first and second color channel run mode workpiece image data to determine corresponding pixel values for corresponding run mode synthetic image data that is analyzed by the trained defect detection portion. For example, for a set of run mode workpiece image data corresponding to the images shown in FIGS. 8A and 8C, the defect detection portion 140dp may determine ratios of pixel values between blue color channel image data corresponding to the image shown in FIG. 8A and red color channel image data corresponding to the image shown in FIG. 8C, in order to determine corresponding pixel values for run mode synthetic image data (e.g., corresponding to the synthetic image shown in FIG. 8F), which is analyzed by the defect detection portion 140dp.

In various implementations, the method 1000 also includes selecting the components of the light source configuration to provide the wavelengths of the first and second color light based at least in part on the reflectance profiles of the first and second materials. For example, by comparing reflectance profiles of aluminum and copper, a first wavelength (e.g., corresponding to a wavelength of blue light) may be determined at which a difference between the reflectance of aluminum and the reflectance copper is approximately maximized and/or greater than a first threshold value, etc. (e.g., within the practical limitations of the system). A second wavelength (e.g., corresponding to a wavelength of red light) may be determined at which a difference between the reflectance of aluminum and the reflectance copper is approximately minimized and/or less than a second threshold value (e.g., within the practical limitations of the system). A first LED (e.g., blue LED) may be selected to be installed or otherwise utilized in the system that outputs light having the first wavelength (e.g., as a characterizing wavelength for a spectrum that is output by the first LED), and a second LED (e.g., red LED) may be selected to be installed or otherwise utilized in the system that outputs light having the second wavelength (e.g., as a characterizing wavelength for a spectrum that is output by the second LED).

In various implementations, the method 1000 also includes performing one or more metrology operations using one or more defect images (e.g., that include workpieces with defects). For example, the defect detection portion 140dp may utilize run mode image data corresponding to the images of FIGS. 8A and 8C to generate run mode synthetic image data corresponding to the synthetic image 902 shown in FIG. 9, and one or more video tools may be utilized to perform a metrology operation in which a dimension D2 of the defect 904 is determined, as described above in connection with FIG. 9.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

For example, although utilization of different color channels to enhance defect detection is described above in connection with the images shown in FIGS. 7A-7E and 8A-8F, in accordance with the present disclosure different color channels may also be used to enhance defect detection in connection with the images shown in FIGS. 3A-3F, 4A-4E, and 5A-5D. The defects shown in FIGS. 3A-3F, 4A-4E, and 5B-5D are scratches on a textured plate, which in one specific illustrative example may be an aluminum substrate that is covered by copper, wherein each of the scratches may expose the aluminum substrate underneath the copper, which would correspond to a defect, and which would show up in the different color images, and in particular in synthetic images generated using a ratio of blue pixels values to red pixels values, as described above. More specifically, two images could be taken for each of the example images shown in FIGS. 3A-3F, 4A-4E, and 5B-5D, including a first monochrome image captured while the workpiece is illuminated with blue light and a second monochrome image captured while the workpiece is illuminated with red light. The corresponding image data may be used to generate synthetic monochrome image data for a corresponding synthetic monochrome image with pixels having values that are calculated based on ratios of values of corresponding pixels included in the first monochrome image and the second monochrome image, wherein such synthetic monochrome image data is used for the training and run modes of the defect detection portion 140dp, correspondingly.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A workpiece inspection and defect detection system, comprising:
    a light source configuration that is configured to provide a plurality of color channels, with each color channel corresponding to a different color;
    a lens configuration that inputs image light arising from a surface of a workpiece which is illuminated by the light source configuration, and transmits the image light along an imaging optical path;
    a camera configuration that receives imaging light transmitted along the imaging optical path for providing workpiece images;
    one or more processors; and
    a memory coupled to the one or more processors and storing program instructions that when executed by the one or more processors cause the one or more processors to at least:
        acquire training mode workpiece images for acquiring a plurality of sets of training mode workpiece image data, wherein each set of training mode workpiece image data comprises first color channel training mode workpiece image data corresponding to a first color channel, and second color channel training mode workpiece image data corresponding to a second color channel;

train a defect detection portion based at least in part on the plurality of sets of training mode workpiece image data;

acquire run mode workpiece images for acquiring a plurality of sets of run mode workpiece image data, wherein each set of run mode workpiece image data comprises first color channel run mode workpiece image data corresponding to the first color channel, and second color channel run mode workpiece image data corresponding to the second color channel; and utilize the trained defect detection portion to perform analysis that is based at least in part on the plurality of sets of run mode workpiece image data to determine defect images that include workpieces with defects.

2. The system of claim 1, wherein:

the training of the defect detection portion based at least in part on the plurality of sets of training mode workpiece image data comprises, for each set of training mode workpiece image data, utilizing the corresponding first and second color channel training mode workpiece image data to generate corresponding training mode synthetic image data that is utilized to train the defect detection portion; and the utilizing of the trained defect detection portion to perform analysis that is based at least in part on the plurality of sets of run mode workpiece image data to determine defect images that include workpieces with defects comprises, for each set of run mode workpiece image data, utilizing the corresponding first and second color channel run mode workpiece image data to generate corresponding run mode synthetic image data that is analyzed by the trained defect detection portion.

3. The system of claim 1, wherein:

for each set of training mode workpiece image data, a plurality of ratios are determined between the corresponding first and second color channel training mode workpiece image data; and for each set of run mode workpiece image data, a plurality of ratios are determined between the corresponding first and second color channel run mode workpiece image data.

4. The system of claim 3, wherein:

the determining of the plurality of ratios between the corresponding first and second color channel training mode workpiece image data comprises, for each pixel value of the corresponding first color channel training mode workpiece image data, determining a ratio between that pixel value and a corresponding pixel value of the corresponding second color channel training mode workpiece image data; and the determining of the plurality of ratios between the corresponding first and second color channel run mode workpiece image data comprises, for each pixel value of the corresponding first color channel run mode workpiece image data, determining a ratio between that pixel value and a corresponding pixel value of the corresponding second color channel run mode workpiece image data.

5. The system of claim 4, wherein:

the training of the defect detection portion based at least in part on the plurality of sets of training mode workpiece image data comprises, for each set of training mode workpiece image data, utilizing the ratios of the pixel values of the corresponding first and second color channel training mode workpiece image data to determine corresponding pixel values for corresponding training mode synthetic image data that is utilized for training the defect detection portion; and the utilizing of the trained defect detection portion to perform analysis that is based at least in part on the plurality of sets of run mode workpiece image data to determine defect images that include workpieces with defects comprises, for each set of run mode workpiece image data, utilizing the ratios of the pixel values of the corresponding first and second color channel run mode workpiece image data to determine corresponding pixel values for corresponding run mode synthetic image data that is analyzed by the trained defect detection portion.

6. The system of claim 1, wherein the light source configuration comprises a first light source for providing first color light for the first color channel and a second light source for providing second color light for the second color channel, for which the first and second color light correspond to different wavelengths of light.

7. The system of claim 6, wherein the first light source is a first light emitting diode and the second light source is a second light emitting diode.

8. The system of claim 1, wherein at least some workpieces that are inspected include first and second materials for which a presence of exposed second material in an image corresponds to a defect that is detectable by the trained defect detection portion.

9. The system of claim 1, wherein at least some workpieces that are inspected include first and second materials for which the first and second materials have first and second reflectance profiles such that a reflectance of the first material is greater than a reflectance of the second material for a first color light that corresponds to the first color channel, and the reflectance of the second material is greater than or equal to the reflectance of the first material for a second color light that corresponds to the second color channel.

10. The system of claim 9, wherein components of the light source configuration are selected to provide the wavelengths of the first and second color light based at least in part on the reflectance profiles of the first and second materials.

11. The system of claim 9, wherein the light source configuration is configured to provide the first and second color light, and is also configured to provide a third color light for a third color channel, for which:

the first and second color light is selected to be utilized and the third color light is not selected to be utilized for inspecting workpieces with the first and second materials based on the reflectance profiles of the first and second materials.

12. The system of claim 11, wherein:

the third color light is selected to be utilized for inspecting workpieces with a third material based on a reflectance profile of the third material which is different than the first and second reflectance profiles.

13. The system of claim 1, wherein:

for each set of training mode workpiece image data, the corresponding first and second color channel training mode workpiece image data are produced by respective first and second camera image planes; and for each set of run mode workpiece image data, the corresponding first and second color channel run mode workpiece image data are produced by respective first and second camera image planes.

14. The system of claim 1, wherein the program instructions when executed by the one or more processors further cause the one or more processors to:

perform one or more metrology operations using one or more defect images.

15. A method of operating a workpiece inspection and defect detection system, the method comprising:

acquiring training mode workpiece images for acquiring a plurality of sets of training mode workpiece image data, wherein each set of training mode workpiece image data comprises first color channel training mode workpiece image data corresponding to a first color channel, and second color channel training mode workpiece image data corresponding to a second color channel;

training a defect detection portion based at least in part on the plurality of sets of training mode workpiece image data;

acquiring run mode workpiece images for acquiring a plurality of sets of run mode workpiece image data, wherein each set of run mode workpiece image data comprises first color channel run mode workpiece image data corresponding to the first color channel, and second color channel run mode workpiece image data corresponding to the second color channel; and utilizing the trained defect detection portion to perform analysis that is based at least in part on the plurality of sets of run mode workpiece image data to determine defect images that include workpieces with defects.

16. The method of claim 15, wherein:

the training of the defect detection portion based at least in part on the plurality of sets of training mode workpiece image data comprises, for each set of training mode workpiece image data, utilizing the corresponding first and second color channel training mode workpiece image data to generate corresponding training mode synthetic image data that is utilized to train the defect detection portion; and the utilizing of the trained defect detection portion to perform analysis that is based at least in part on the plurality of sets of run mode workpiece image data to determine defect images that include workpieces with defects comprises, for each set of run mode workpiece image data, utilizing the corresponding first and second color channel run mode workpiece image data to generate corresponding run mode synthetic image data that is analyzed by the trained defect detection portion.

17. The method of claim 15, wherein:

for each set of training mode workpiece image data, a plurality of ratios are determined between the corresponding first and second color channel training mode workpiece image data; and for each set of run mode workpiece image data, a plurality of ratios are determined between the corresponding first and second color channel run mode workpiece image data.

18. The method of claim 15, wherein:

at least some workpieces that are inspected include first and second materials for which the first and second materials have first and second reflectance profiles such that a reflectance of the first material is greater than a reflectance of the second material for a first color light that corresponds to the first color channel, and the reflectance of the second material is greater than or equal to the reflectance of the first material for a second color light that corresponds to the second color channel; and the method further comprises selecting the components of a light source configuration to provide the wavelengths of the first and second color light based at least in part on the reflectance profiles of the first and second materials.

19. The method of claim 15, further comprising:

performing one or more metrology operations using one or more defect images.

* * * * *